United States Patent
DeGraaff et al.

(10) Patent No.: US 8,229,908 B2
(45) Date of Patent: *Jul. 24, 2012

(54) DIVIDING FINANCIAL-DATA TO FACILITATE SIMULTANEOUS MODIFICATIONS BY MULTIPLE USERS

(75) Inventors: David B. DeGraaff, Mountain View, CA (US); Andrew D. Holmes, Edmonton (CA); Puja Ramani, Fremont, CA (US); Teresa L. Roberts, Palo Alto, CA (US); Harold E. Schoolcraft, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 341 days.

This patent is subject to a terminal disclaimer.

(21) Appl. No.: 11/799,211

(22) Filed: Apr. 30, 2007

(65) Prior Publication Data

US 2008/0183711 A1 Jul. 31, 2008

Related U.S. Application Data

(63) Continuation-in-part of application No. 11/701,285, filed on Jan. 31, 2007.

(51) Int. Cl.
G06F 17/30 (2006.01)
(52) U.S. Cl. .......................... 707/704; 707/695
(58) Field of Classification Search .................. None
See application file for complete search history.

(56) References Cited

U.S. PATENT DOCUMENTS

| | | | | |
|---|---|---|---|---|
| 5,768,519 A | * | 6/1998 | Swift et al. | 709/223 |
| 5,983,277 A | * | 11/1999 | Heile et al. | 709/232 |
| 6,341,291 B1 | * | 1/2002 | Bentley et al. | 707/203 |
| 7,032,033 B1 | * | 4/2006 | Ledoux et al. | 709/248 |
| 7,085,909 B2 | * | 8/2006 | Ananthanarayanan et al. | 711/202 |
| 7,694,292 B2 | * | 4/2010 | Mueller et al. | 717/170 |
| 7,805,423 B1 | * | 9/2010 | Romine et al. | 707/704 |
| 2003/0172168 A1 | * | 9/2003 | Mak et al. | 709/230 |
| 2004/0221125 A1 | * | 11/2004 | Ananthanarayanan et al. | 711/203 |
| 2008/0104140 A1 | * | 5/2008 | Vierich et al. | 707/202 |

* cited by examiner

*Primary Examiner* — Baoquoc To
(74) *Attorney, Agent, or Firm* — Park, Vaughan, Fleming & Dowler LLP

(57) ABSTRACT

One embodiment of the present invention provides a system that facilitates dividing financial data to facilitate simultaneous modifications by multiple users. During operation, the system receives division-criteria, which facilitates dividing financial-data into a first subset and a second subset. Next, the system creates a copy of the financial-data which includes the division-criteria. The system then allows a first user to modify the first subset of the financial-data. The system also sends the copy of the financial-data to a second user, thereby enabling the second user to modify the second subset of the financial-data in the copy of the financial-data to create a change file. Subsequently, the system receives the change file from the second user, wherein the change file comprises modifications to the financial-data. Finally, the system merges the change file into the financial-data.

23 Claims, 31 Drawing Sheets

FIG. 17

Accountant's Changes (not yet imported)

Please review and print the changes from your accountant for your records. Select Import to bring these changes into your file. QuickBooks will back up your company data before importing your accountant's changes.

Accountant's Note:

| | Action | Type | Num | Date | Name |
|---|---|---|---|---|---|
| ⊞ 1. | Add | Vendor | | | PG&E |
| ⊞ 2. | Delete | Receive Payment | | 08/23/2006 | Becky Farley |
| ⊟ 3. | Mod | Invoice | 1 | 08/23/2006 | Becky Farley |

Template: Intuit Product Invoice  Class:
Bill Address:  Ship Address:
P.O Number:  Terms:
Pending: no  Due Date: 08/23/2006
Ship Date: 08/23/2006  Item Sales Tax: Out of State
Customer Sales Tax: Tax  Sales Representative:
Ship Method:  FOB:
Customer Message:  To be Printed: yes

| Item | Description | Quantity | Rate | Amount | Account | Class | SalesTaxCode | Memo | Amount |
|---|---|---|---|---|---|---|---|---|---|
| Non-Inventory Item | Non-Inventory part item description | 1 | 800.00 | 800.00 | Accounts Receivable | | Tax | | 800.00 |
| Consignment Item | Consigned Non-Inventory Part Item Description | 3 | 100.00 | 300.00 | Accounts Receivable | | Tax | | 1100.00 |

[Expand All] [Collapse All]   [Import] [Close] [Help]   [Print]

Convert Accountant's Copy Transfer File Overview

Should you use the Accountant's Copy?

The Accountant's Copy allows you to make changes and send these changes back to your client, who can import them in the current company file.

What you CANNOT do
- Edit any transactions dated after the dividing date
- You cannot add, edit or delete payroll transactions, payroll items and employee payroll information.
- You cannot reconcile accounts and send this information back to your clients
- You cannot edit customers, vendors or items

What you CAN do
- Add, edit and delete most types of transactions dated on or before the dividing date
- Add new transactions after the dividing date
- Add and edit the chart of accounts (except merge and delete)
- Add new customers, vendors and items If the Accountant's Copy does not meet your needs, you can convert it to a regular company file.

How do I convert an Accountant's Copy file to a regular file?

[ Back ]  [ Next ]  [ Finish ]   [ Help ]  [ Cancel ]

DIVIDING FINANCIAL-DATA TO FACILITATE SIMULTANEOUS MODIFICATIONS BY MULTIPLE USERS

RELATED APPLICATION

This application is a continuation-in-part of, and hereby claims priority under 35 U.S.C. §120 to, U.S. patent application Ser. No. 11/701,285, entitled "METHOD AND APPARATUS FOR FACILITATING SIMULTANEOUS MODIFICATIONS TO FINANCIAL-DATA BY MULTIPLE USERS," by inventors David B. DeGraaff, Andrew D. Holmes, Puja Ramani, Teresa L. Roberts, and Harold E. Schoolcraft, filed on 31 Jan. 2007, which is herein incorporated by reference.

BACKGROUND

Related Art

Organizations typically use software to manage their financial-data. In such organizations, multiple users will often interact with a financial-data file, which can potentially cause the data in the financial-data file to become corrupted. This problem can be solved by locking the financial-data file while a user is editing it. This prevents multiple users from simultaneously updating the financial-data. However, locking the data file also prevents the other users from accessing the data file, which can hinder the other users from completing their work in a timely manner.

Another common problem with financial software is that there often exists no method for reviewing the changes to the financial-data. Consequently, if the user makes mistakes while editing the financial-data, it is possible for these mistakes to go undetected. Furthermore, even if it can be determined that there is a mistake, it can be difficult to identify where the mistake was made.

SUMMARY

One embodiment of the present invention provides a system that facilitates dividing financial data to facilitate simultaneous modifications by multiple users. During operation, the system receives division-criteria, which facilitates dividing financial-data into a first subset and a second subset. Next, the system creates a copy of the financial-data which includes the division-criteria. The system then allows a first user to modify the first subset of the financial-data. The system also sends the copy of the financial-data to a second user, thereby enabling the second user to modify the second subset of the financial-data in the copy of the financial-data to create a change file. Subsequently, the system receives the change file from the second user, wherein the change file comprises modifications to the financial-data. Finally, the system merges the change file into the financial-data.

In some embodiments of the present invention, the system creates an additional copy of the financial-data file which includes the division-criteria, wherein the division-criteria facilitates dividing the financial-data into three or more subsets. During operation, the system sends the additional copy of the financial-data to a third user, thereby enabling the third user to modify a third subset of the financial-data in the additional copy of the financial-data to create an additional change file. The system also receives the additional change file from the third user. Finally, the system merges the additional change file into the financial-data.

In some embodiments of the present invention, the first user has read-only access to the second subset of the financial-data, and the second user has read-only access to the first subset of the financial-data.

In some embodiments of the present invention, the system receives a cancel command to cancel the simultaneous modifications to the financial data. In response to the cancel command, the system grants the first user read-write access to the second subset of the financial-data. The system also discards the change file from the second user.

In some embodiments of the present invention, the first user is allowed to create data items in the second subset of the financial-data, and the second user is allowed to create data items in the first subset of the financial-data. In other embodiments of the present invention, the first user is allowed to create data items in the first subset of the financial data and in the second subset of the financial-data, while the second user is allowed to create data items only in the second subset of the financial-data. In other embodiments of the present invention, the second user is allowed to create data items in the first subset of the financial data and in the second subset of the financial-data, while the first user is allowed to create data items only in the first subset of the financial-data.

In some embodiments of the present invention, the first user has read-write access to data items in the second subset of the financial-data, and the second user has read-write access to the data items in the first subset of the financial-data.

In some embodiments of the present invention, the division-criteria can include: a division date, a date-range, an account type, an object type, and a transaction type.

In some embodiments of the present invention, receiving the division-criteria can involve receiving the division-criteria from: the first user, the second user, or a third-party.

In some embodiments of the present invention, the copy of the financial-data comprises only the second subset of the financial-data.

BRIEF DESCRIPTION OF THE FIGURES

FIG. 17 illustrates a display window for displaying contents of a change file to a first user in accordance with an embodiment of the present invention.

FIG. 22 illustrates a second overview window for converting a financial-data transfer file into a copy of a financial-data file in accordance with an embodiment of the present invention.

FIG. 28 illustrates a window for displaying contents of a change file to a second user in accordance with an embodiment of the present invention.

DETAILED DESCRIPTION

Figure 1:
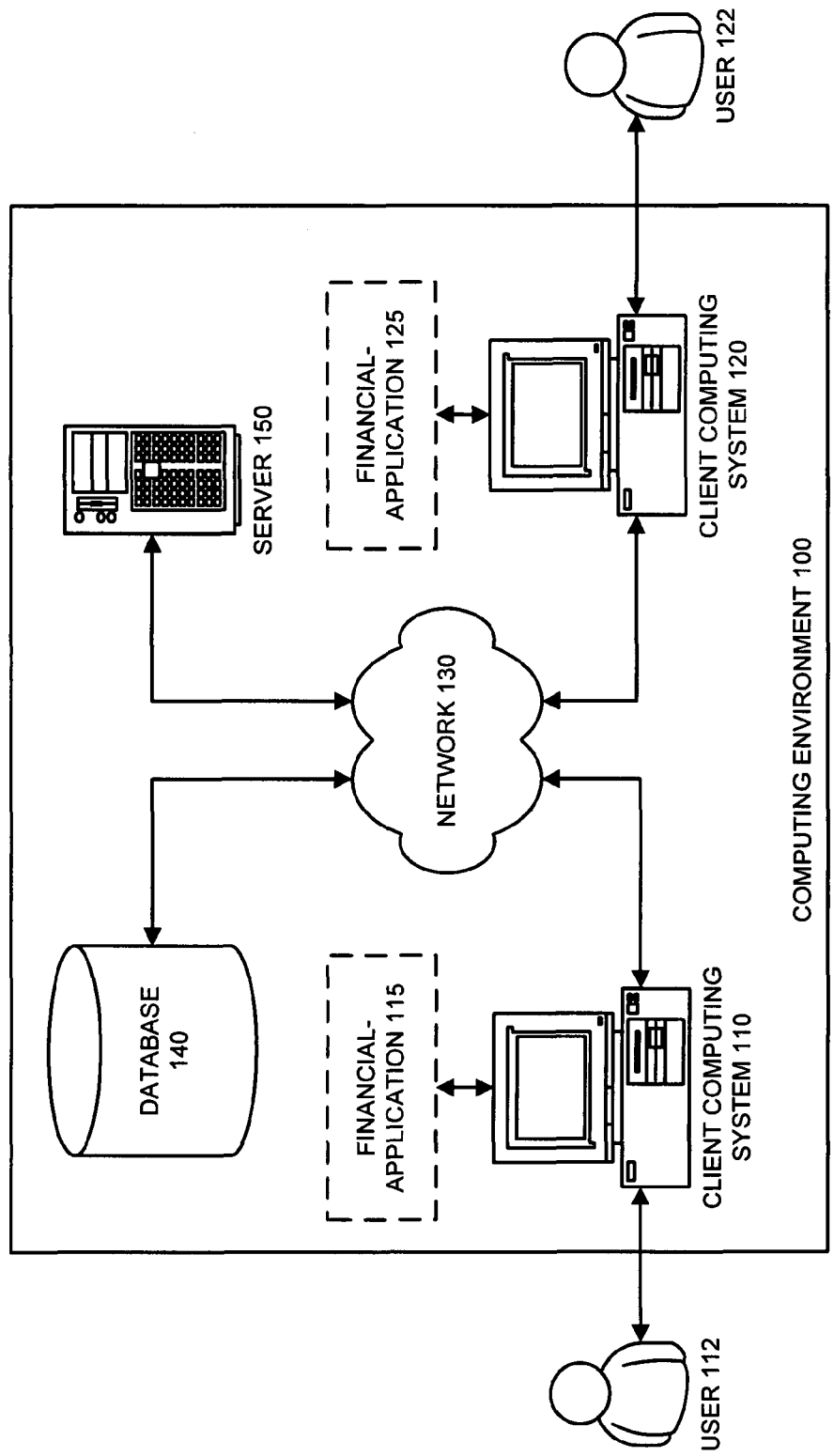
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a financial-application that allows multiple users to concurrently edit a financial-data file. In order to accomplish this, the financial-application enables a first user to insert a division-date into the financial-data file. This division-date divides the financial-data file into two subsections. Financial-data associated with a date that is later than the division-date constitutes the first subsection. Financial-data associated with a date that is prior to or equal to the division-date constitutes the second subsection. The first user can then edit any financial-data that the first subsection includes, while a second user can edit any financial-data that the second subsection includes. Note that both users can view all of the financial-data.

In one embodiment of the present invention, the first user can divide the financial-data file into multiple subsections by inserting multiple division-dates into the financial-data file. In this embodiment, a user is associated with a subsection of the financial-data file. Although each user can view the entire financial-data file, a particular user can only edit the subsection of the financial-data file that is associated with the particular user.

In one embodiment of the present invention, a user can only view the subsection of the financial-data file that the user can edit.

In one embodiment of the present invention, the first user can send a copy of the financial-data file to a second user. The second user can then edit the second subsection of the copy of the financial-data file while the first user edits the first subsection of the financial-data file.

In one embodiment of the present invention, the second user can send a change file to the first user. This change file includes any modifications the second user made to the financial-data file. Note that the change file would only include modifications to financial-data associated with the second subsection of the financial-data file.

In one embodiment of the present invention, the financial-data application can display the change file to the first user. The first user can then decide whether to merge the changes to financial-data that the change file specifies with the financial-data file.

In one embodiment of the present invention, the financial-application can be any application that can access data.

In one embodiment of the present invention, the financial-data can be any type of data, and the financial-data file can be any file that can include the data.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, computing environment 100 includes client computing system 110, client computing system 120, financial-application 115, financial-application 125, network 130, database 140, and server 150.

Client computing system 110 and client computing system 120 can generally include any node on a network including computational capability and including a mechanism for communicating across the network.

Financial-application 115 and financial-application 125 can generally include any application capable of accessing financial-data. In one embodiment of the present invention, Financial-application 115 and financial-application 125 can access any data that a computer system can store, and are not restricted to accessing financial-data.

In one embodiment of the present invention, financial-application 115 and financial-application 125 are two components of the same financial-application.

In one embodiment of the present invention, financial-application 115 and financial-application 125 are two installations of the same financial-application.

In one embodiment of the present invention, client computing system 110 hosts financial-application 115, and client computing system 120 hosts financial-application 125.

In one embodiment of the present invention, client computing system 110 and client computing system 120 belong to two different organizations. In this embodiment, financial-application 115 cannot access financial-data associated with financial-application 125 without receiving a financial-data file from user 122, and financial-application 125 cannot access financial-data associated with financial-application 115 without receiving a financial-data file from user 112.

Network 130 can generally include any type of wired or wireless communication channel capable of coupling together computing nodes. This includes, but is not limited to, a local area network, a wide area network, or a combination of networks. In one embodiment of the present invention, network 130 comprises the Internet.

Database 140 can generally include any type of system for storing data in non-volatile storage. This includes, but is not limited to, systems based upon magnetic, optical, and magneto-optical storage devices, as well as storage devices based on flash memory and/or battery-backed up memory. In one embodiment of the present invention, database 140 can store financial-data files associated with financial-data.

In one embodiment of the present invention, financial-application 115 and financial-application 125 can access financial-data files stored on database 140.

Server 150 can generally include any computational node including a mechanism for servicing requests from a client for computational and/or data storage resources. In one embodiment of the present invention, server 150 can store financial-data files associated with financial-data.

In one embodiment of the present invention, financial-application 115 and financial-application 125 can access financial-data files stored on server 150.

User 112 and user 122 can generally include: an individual; a group of individuals; an organization; a group of organizations; a computing system; a group of computing systems; or any other entity that can interact with computing environment 100.

In one embodiment of the present invention, user 112 can be a client (or first user).

In one embodiment of the present invention, user 122 can be an accountant (or second user).

First Process for Facilitating Simultaneous Modifications to Financial-Data

Figure 2:
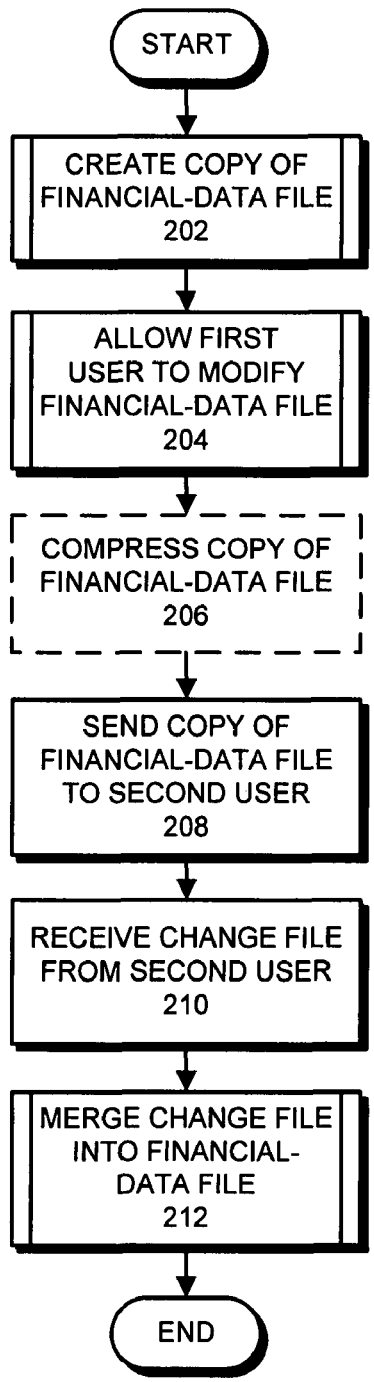
FIG. 2 presents a flow chart illustrating a first process for facilitating simultaneous modifications to financial-data by a first user and a second user in accordance with an embodiment of the present invention.
Figure 9:
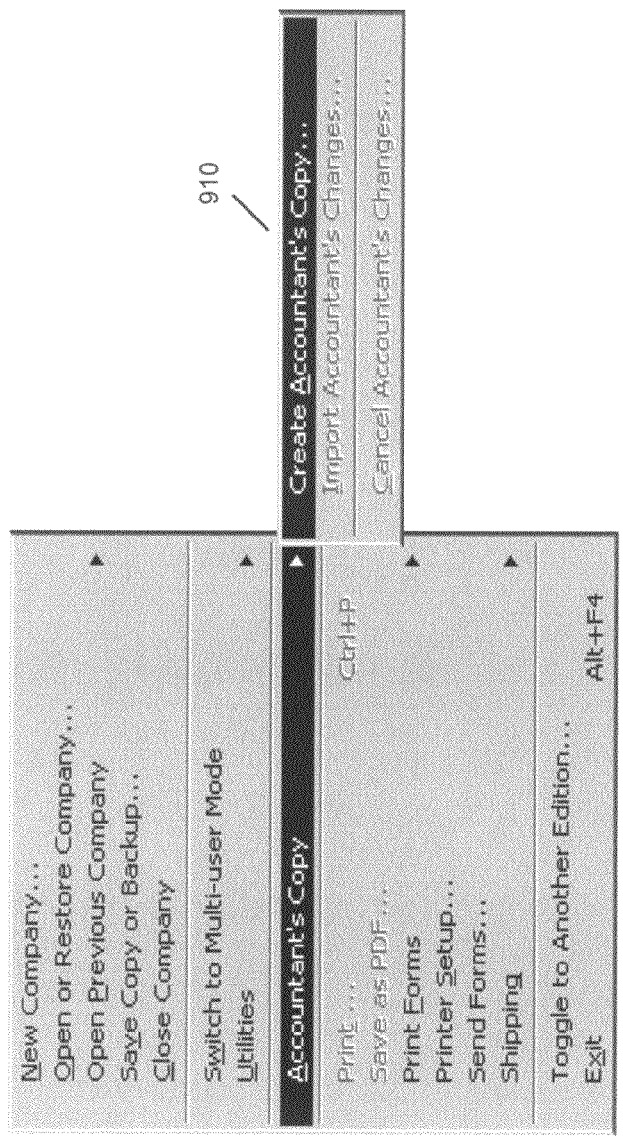
FIG. 9 illustrates a menu item for creating a copy of a financial-data file in accordance with an embodiment of the present invention.
Figure 10:
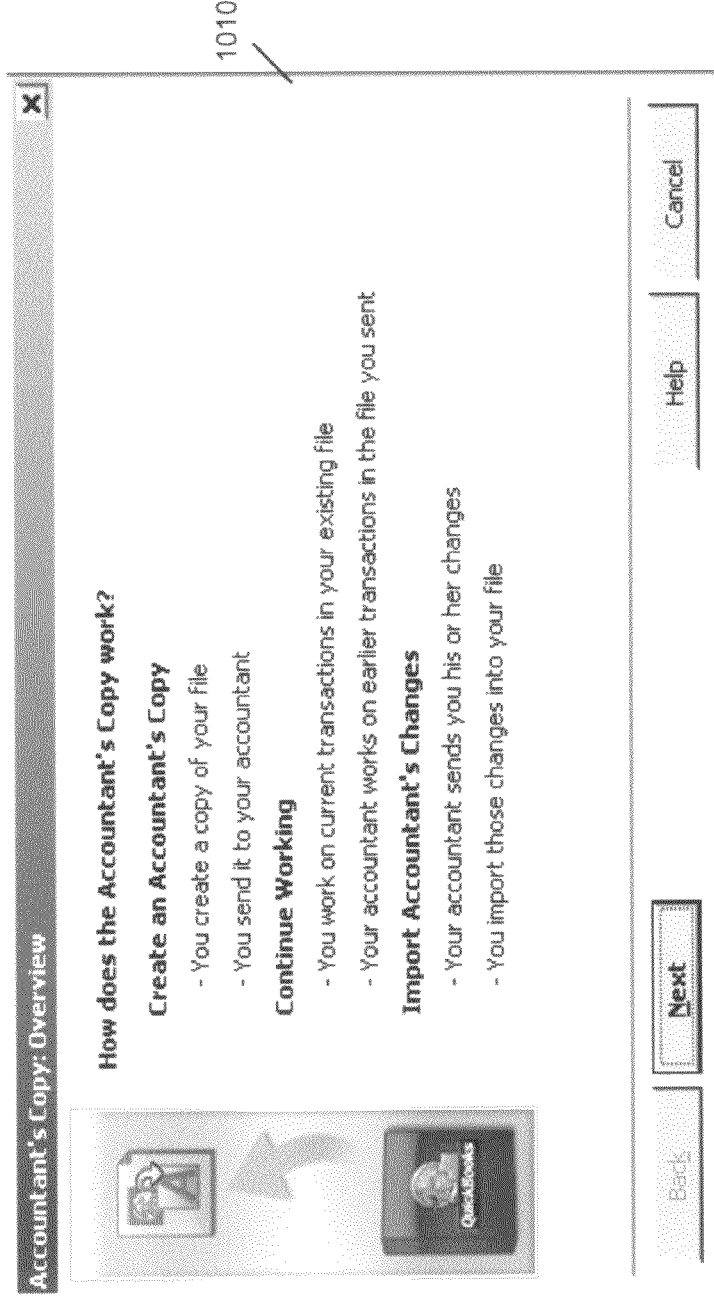
FIG. 10 illustrates an overview window for creating a copy of a financial-data file in accordance with an embodiment of the present invention.

FIG. 2 presents a flow chart illustrating a first process for facilitating simultaneous modifications to financial-data by a first user, user 112, and a second user, user 122, in accordance with an embodiment of the present invention. Note that FIG. 10 illustrates overview-window 1010, which summarizes this first process. The first process begins when financial-application 115 creates a copy of a financial-data file (step 202). In one embodiment of the present invention, user 112 can initiate this process by selecting menu-item 910, which is illustrated in FIG. 9. Note that this is a multi-step process, which is described in more detail below with reference to FIG. 3.

In one embodiment of the present invention, user 112 is a client and user 122 is an accountant.

In one embodiment of the present invention, financial-application 115 creates a copy of a portion of the financial-data file. In this embodiment, the copy of the financial-data file is a sub-set of the financial-data file.

Next, financial-application 115 allows user 112 to modify the financial-data file (step 204). Note that this is a multi-step process, which is described in more detail below with reference to FIG. 4.

In one embodiment of the present invention, financial-application 115 subsequently compresses the copy of the financial-data file (step 206). Note that this is an optional step as is illustrated by the dashed lines surrounding step 206.

Financial-application 115 then sends the copy of the financial-data file to user 122 (step 208), which enables user 122 to modify financial-data associated with the copy of the financial-data file to create a change file. Note that sending the copy of the financial-data file to user 122 can involve sending the copy of the financial-data file to client computing system 120 and/or to financial-application 125.

In one embodiment of the present invention, sending the copy of the financial-data file to user 122 can involve storing the copy of the financial-data file on database 140 and/or server 150 and informing user 122, client computing system 120, or financial-application 125 that the copy of the financial-data file is available.

Next, financial-application 115 receives a change file from user 122 (step 210). Note that this can involve receiving the change file from client computing system 120 or financial-application 125. Furthermore, note that the change file includes modifications to financial-data associated with the financial-data file. These modifications can include: an addition of new financial-data; a deletion of existing financial-data; and an amendment of existing financial-data.

In one embodiment of the present invention, receiving the change file from user 122 can involve retrieving the change file from database 140 or server 150.

Finally, financial-application 115 merges the change file into the financial-data file. Note that this is a multi-step process, which is described in more detail below with reference to FIG. 5.

In one embodiment of the present invention, merging the change file into the financial-data file can involve merging a portion of the change file into the financial-data file.

In one embodiment of the present invention, financial-application 115 can merge the change file with the financial-data file to create a new financial-data file. In this embodiment, the new financial-data file does not replace the financial-data file, but is a separate file.

Creating a Copy of a Financial-Data File

Figure 3:
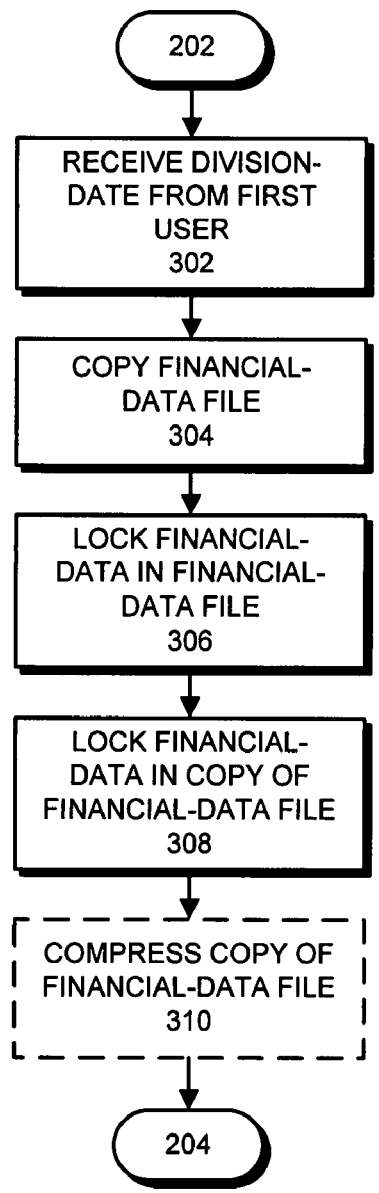
FIG. 3 presents a flow chart illustrating the process of creating a copy of a financial-data file in accordance with an embodiment of the present invention.
Figure 11:
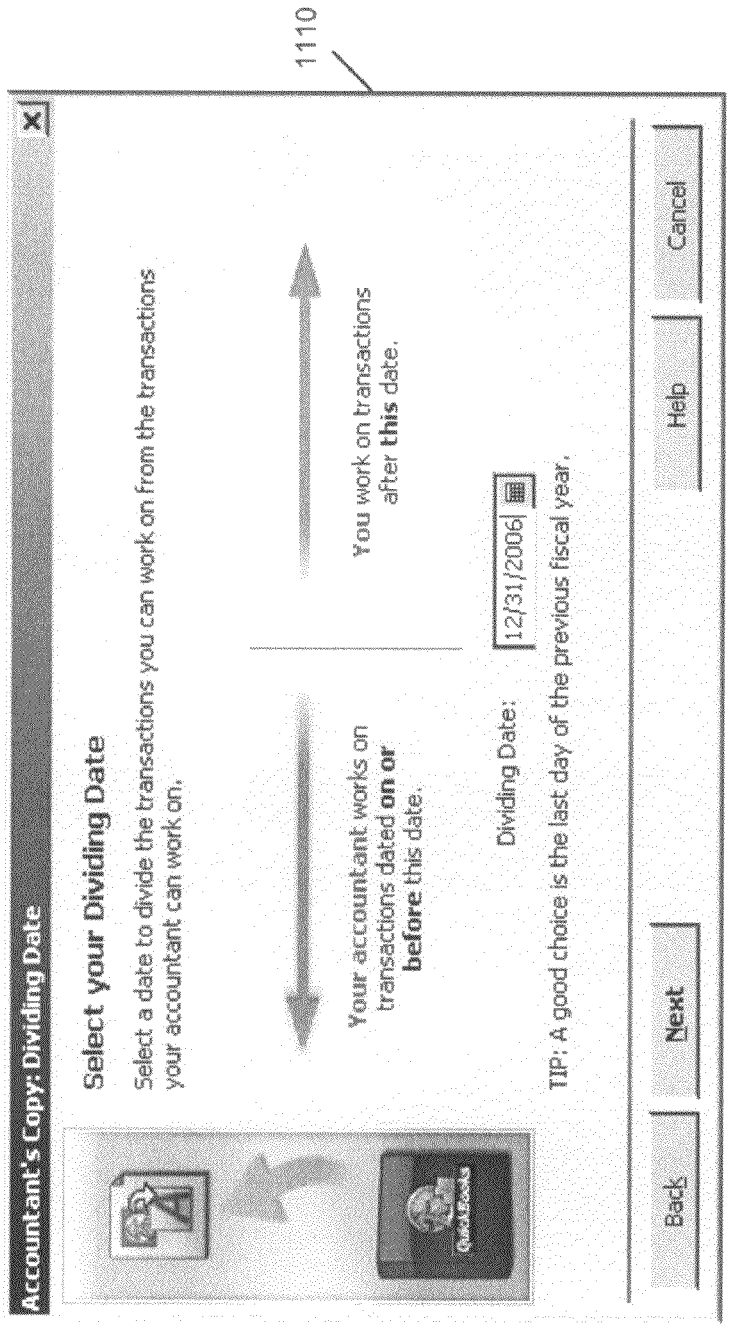
FIG. 11 illustrates a division-date selection window in accordance with an embodiment of the present invention.

FIG. 3 presents a flow chart illustrating the process of creating a copy of a financial-data file in accordance with an embodiment of the present invention. The process begins when financial-application 115 receives a division-date from user 112 (step 302). Note that a division-date divides a financial-data file into two subsets, wherein one subset is editable by user 112 and the other subset is editable by user 122. Furthermore, note that the one subset includes only financial-data associated with a date later than the division-date, and the other subset includes only financial-data associated with a date prior to or equal to the division-date. In one embodiment of the present invention, user 112 can provide a division-date to financial-application 115 by specifying a division-date in division-date selection window 1110, which is illustrated in FIG. 11.

In one embodiment of the present invention, both subsets include all the financial-data associated with the financial-data file. In this embodiment, only financial-data associated with a date later than the division-date is editable in the one subset, and only financial-data associated with a date prior to or equal to the division-date is editable in the other subset.

Figure 12:
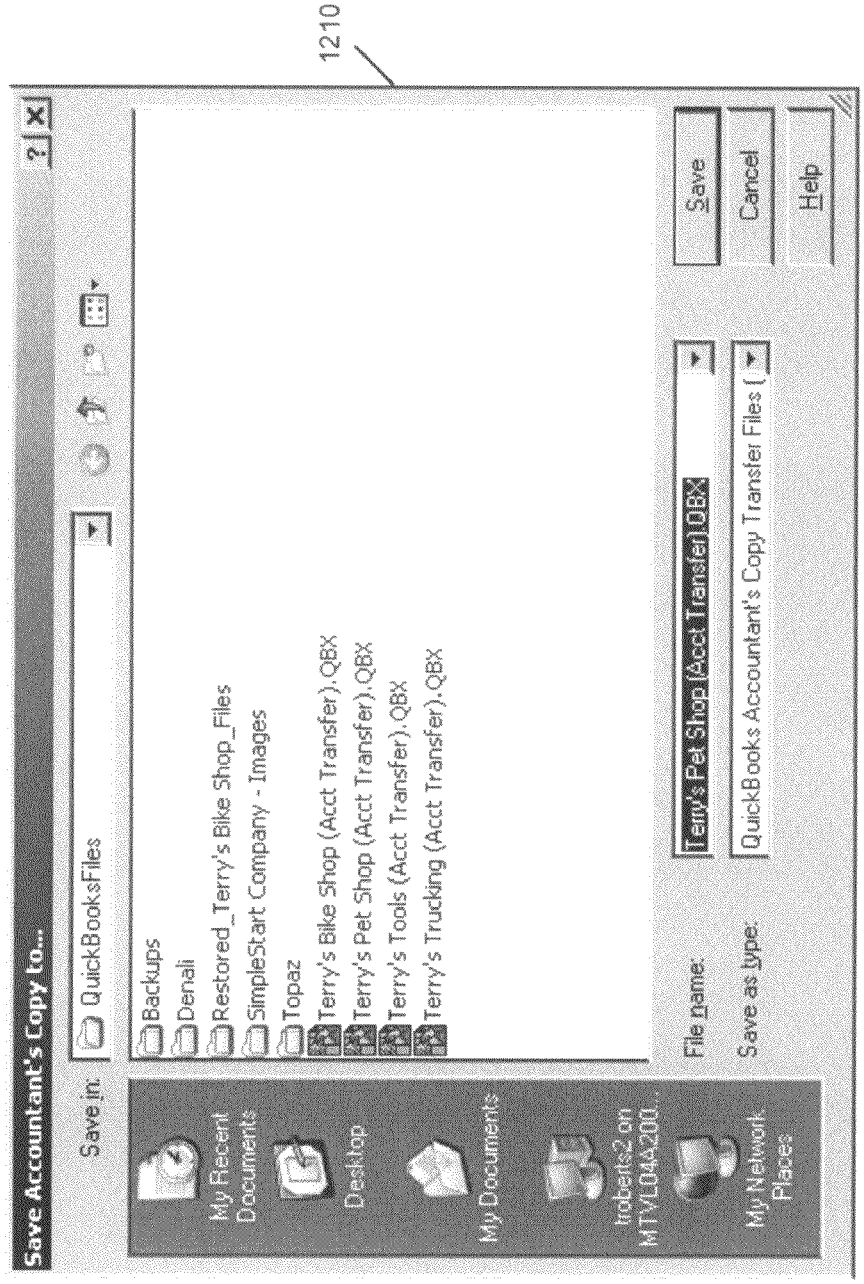
FIG. 12 illustrates a save window for saving a copy of a financial-data file in accordance with an embodiment of the present invention.

Next, financial-application 115 copies the financial-data file to the copy of the financial-data file (step 304). In one embodiment of the present invention, user 112 can select a name and a location for financial-application 115 to save the copy of the financial-data file by using save window 1210, which is illustrated in FIG. 12.

Figure 13:
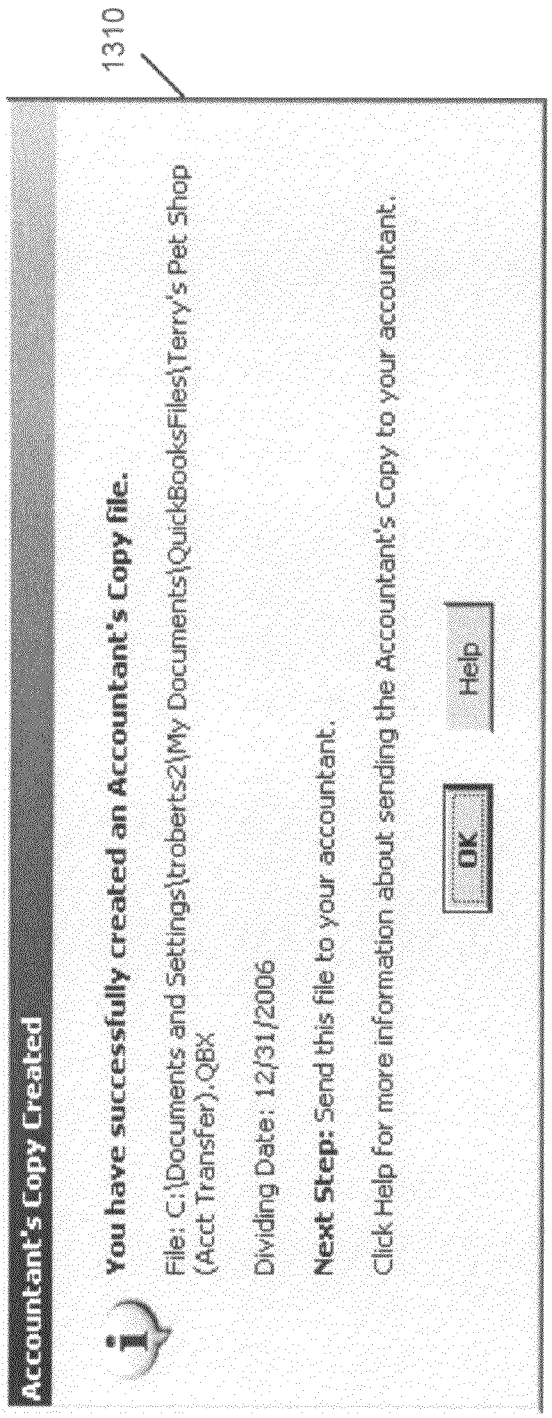
FIG. 13 illustrates a confirmation dialog box, which displays confirmation of creation of a copy of a financial-data file in accordance with an embodiment of the present invention.

In one embodiment of the present invention, after creating the copy of the financial-data file, financial-application 115 can present confirmation dialog box 1310, which is illustrated in FIG. 13, to user 112. This confirmation dialog box indicates to user 112 that financial-application 115 successfully created the copy of the financial-data file.

In one embodiment of the present invention, financial-application 115 copies a subset of the financial-data file to the copy of the financial-data file.

Then, financial-application 115 locks financial-data in the financial-data file (step 306) which is associated with a date that is prior to or equal to the division-date. Note that step 306 prevents user 112 from editing financial-data in the financial-data file associated with a date that is prior to or equal to the division-date. Financial-application 115 then locks financial-data in the copy of the financial-data file (step 308) which is associated with a date that is later than the division-date. Note that step 308 prevents user 122 from editing financial-data in the copy of the financial-data file associated with a date that is later than the division-date.

In one embodiment of the present invention, financial-application 115 then compresses the copy of the financial-data file (step 310). Note that, similarly to step 206, this step is optional as is illustrated by the dashed lines surrounding step 310.

Allowing a First User to Modify a Financial-Data File

Figure 4:
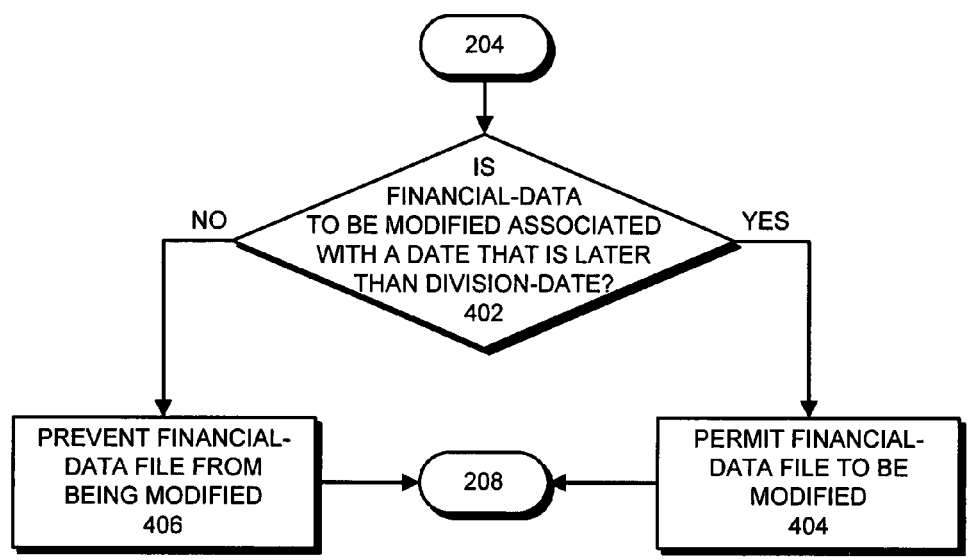
FIG. 4 presents a flow chart illustrating the process of allowing a first user to modify a financial-data file in accordance with an embodiment of the present invention.

FIG. 4 presents a flow chart illustrating the process of allowing a first user, user 112, to modify a financial-data file in accordance with an embodiment of the present invention. The process begins when financial-application 115 determines if user 112 is attempting to modify financial-data which is associated with a date that is later than the division-date (step 402). If so, financial-application 115 permits user 112 to modify the financial-data file (step 404). If not, financial-application 115 prevents user 112 from modifying the financial-data file (step 406).

In one embodiment of the present invention, user 112 can edit the financial-data file by: adding new financial-data; deleting existing financial-data; and amending existing financial-data.

Figure 14:
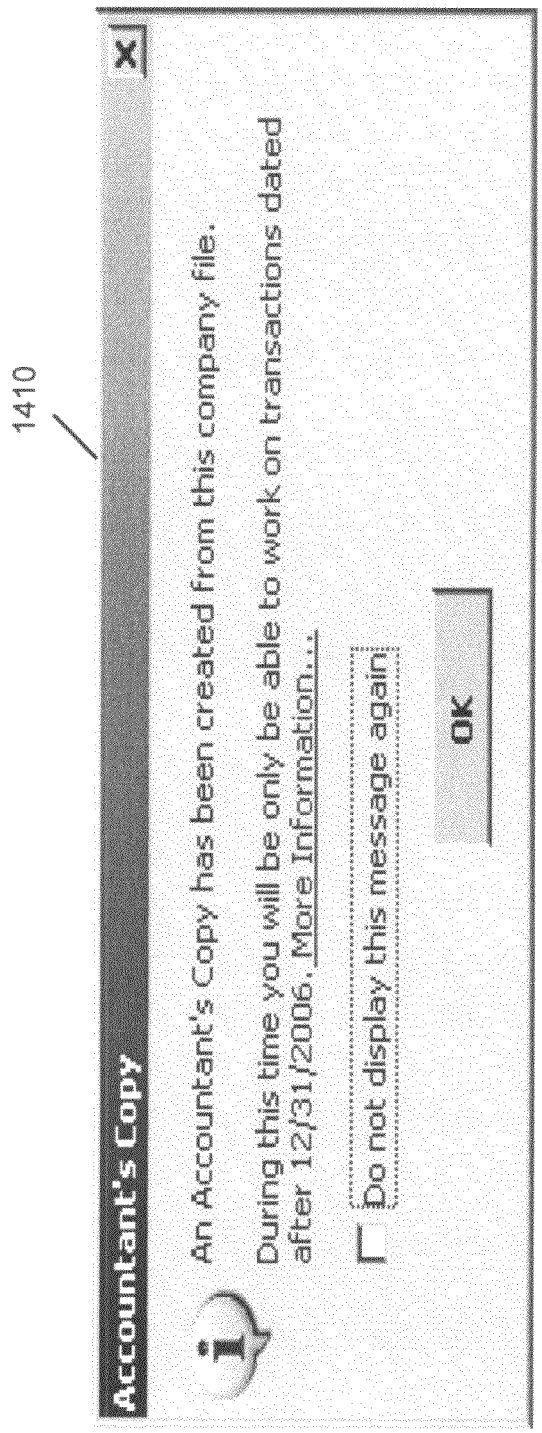
FIG. 14 illustrates a reminder dialog box, which reminds the first user that only financial-data associated with a date later than a division-date can be edited in accordance with an embodiment of the present invention.

In one embodiment of the present invention, prior to giving user 112 access to the financial-data file, financial-application 115 can display reminder dialog box 1410, which is illustrated in FIG. 14. This reminder dialog box 1410 displays to user 112 a reminder that user 112 can only edit financial-data associated with a date later than the division-date.

Figure 19:
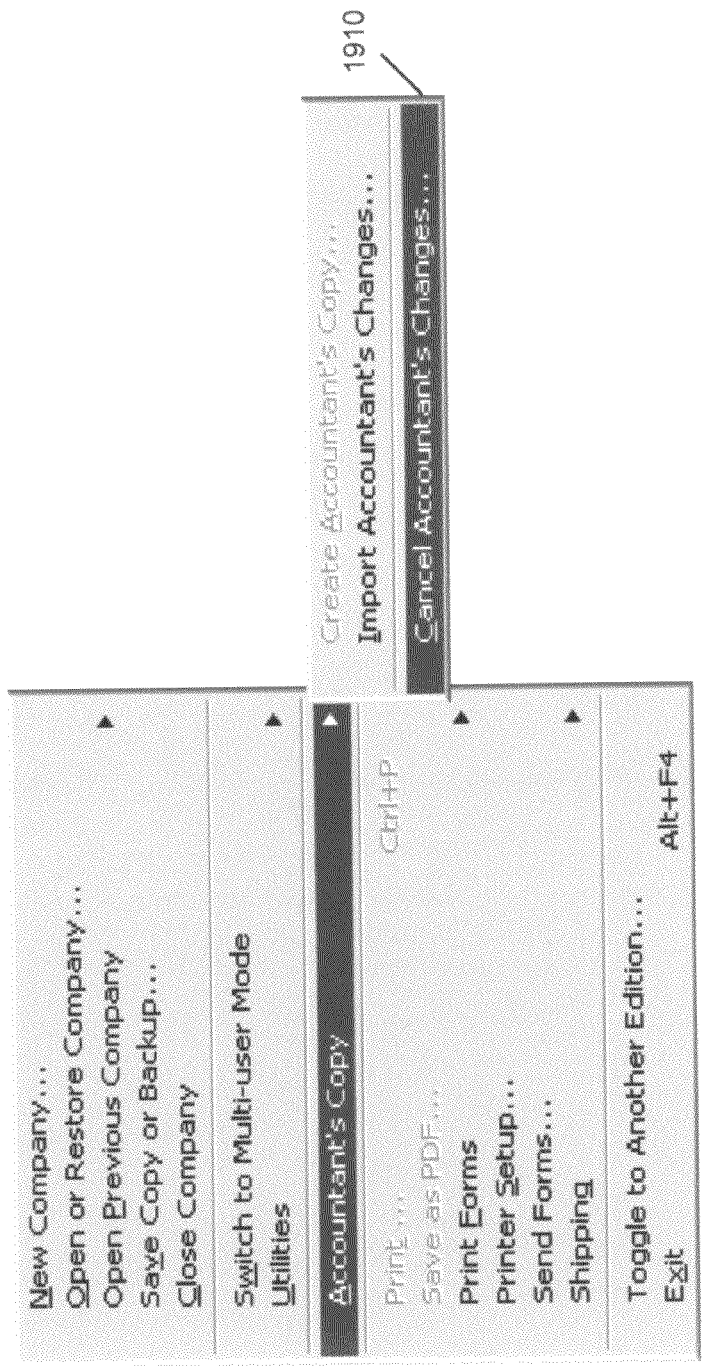
FIG. 19 illustrates a menu item for canceling insertion of a division-date into a financial-data file in accordance with an embodiment of the present invention.

In one embodiment of the present invention, if user 112 desires to edit financial-data associated with a date prior to or equal to the division-date, user 112 can request financial-application 115 to remove the inserted division-date from the financial-data file by selecting menu-item 1910, which is illustrated in FIG. 19. Note that by removing the division-date from the financial-data file, financial-application 115 can no longer merge a change file with the financial-data file.

In one embodiment of the present invention, financial-application 115 can restore the division-date to the financial-data file and merge a change file with the financial-data file by reverting to a backup copy of the financial-data file that still includes the inserted division-date. In this embodiment, any modifications user 112 made to the financial-data file after financial-application 115 created the backup copy of the financial-data file are lost.

Merging a Change File With a Financial-Data File

Figure 5:
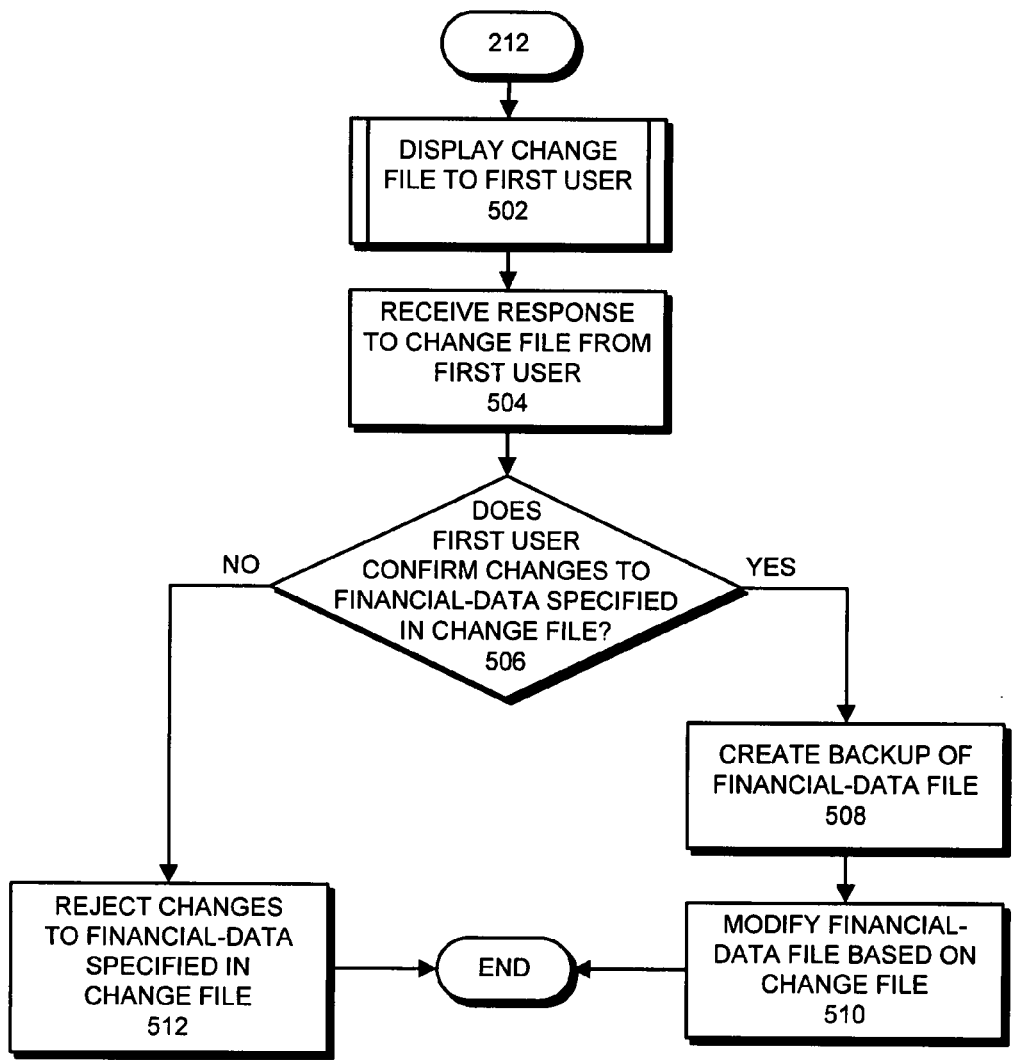
FIG. 5 presents a flow chart illustrating the process of merging a change file with a financial-data file in accordance with an embodiment of the present invention.
Figure 15:
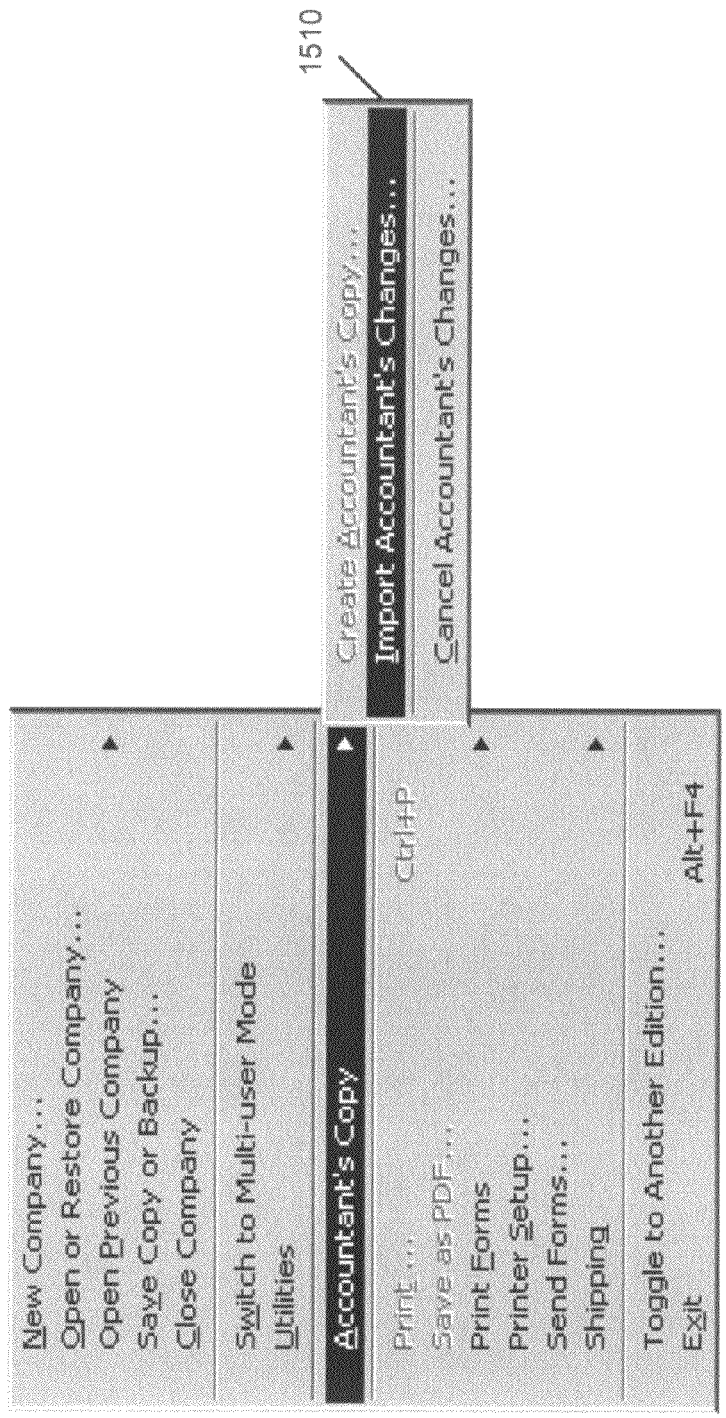
FIG. 15 illustrates a menu item for importing a change file in accordance with an embodiment of the present invention.

FIG. 5 presents a flow chart illustrating the process of merging a change file with a financial-data file in accordance with an embodiment of the present invention. The process begins when financial-application 115 displays a change file to user 112 (step 502). In one embodiment of the present invention, user 112 can initiate this process by selecting menu-item 1510, which is illustrated in FIG. 15. Note that this is a multi-step process, which is described in more detail below with reference to FIG. 6.

Figure 16:
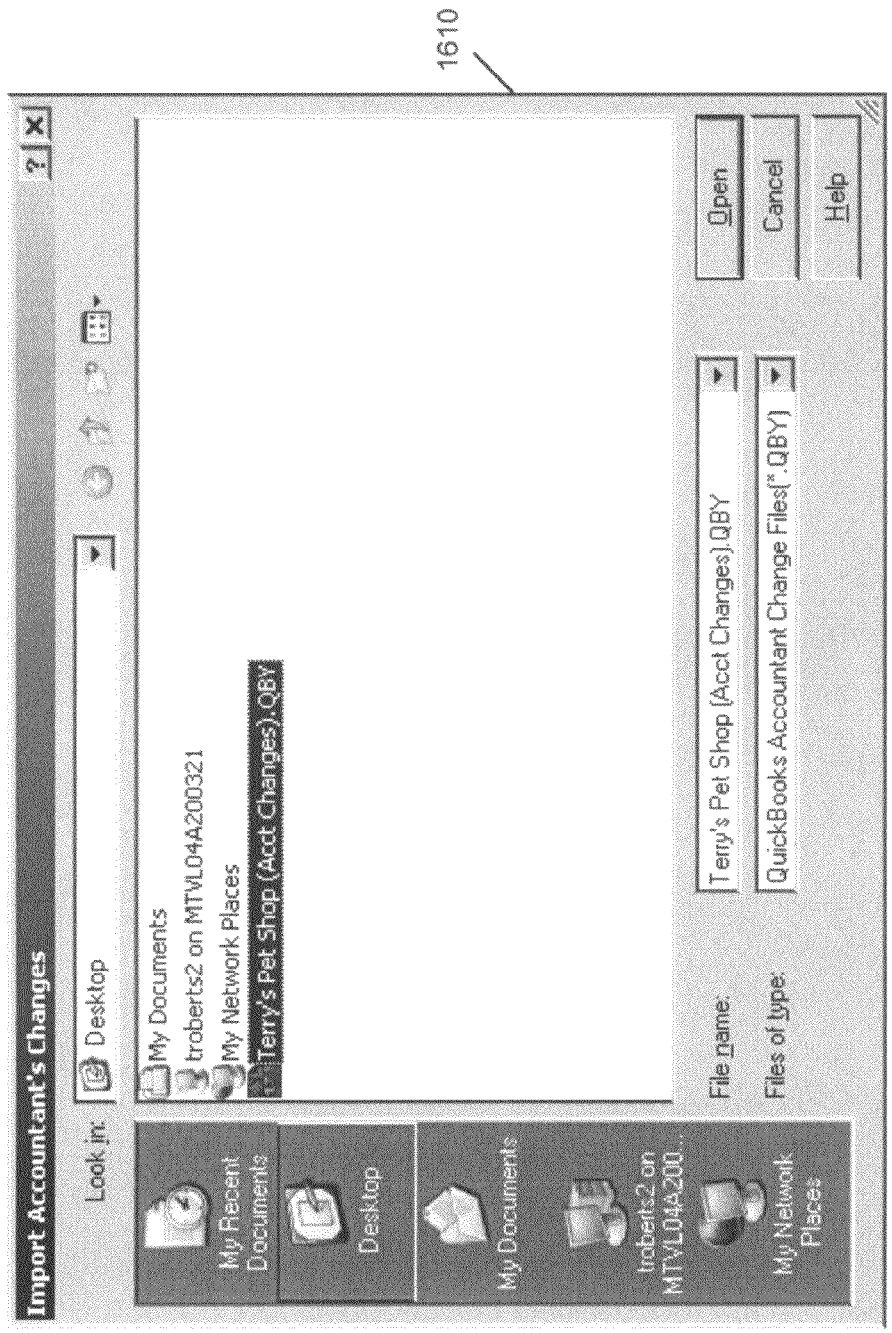
FIG. 16 illustrates a file-selection window for selecting a change file to import in accordance with an embodiment of the present invention.

In one embodiment of the present invention, user 112 can select a change file to import and display by using file selection window 1610, which is illustrated in FIG. 16.

Financial-application 115 then receives a response to the change file from user 112 (step 504). Subsequently, financial-application 115 determines if user 112 confirms the changes to financial-data specified in the change file (step 506). If so, financial-application 115 creates a backup of the financial-data file (step 508). Then, financial-application 115 modifies the financial-data file based on the change file (step 510). Note that this can involve: adding new financial-data to the financial-data file; removing existing financial-data from the financial-data file; and amending existing financial-data from the financial-data file.

If financial-application 115 determines that user 112 does not confirm the changes to the financial-data specified in the change file, financial-application 115 rejects the changes to the financial-data that the change file specifies (step 512).

Displaying a Change File to a First User

Figure 6:
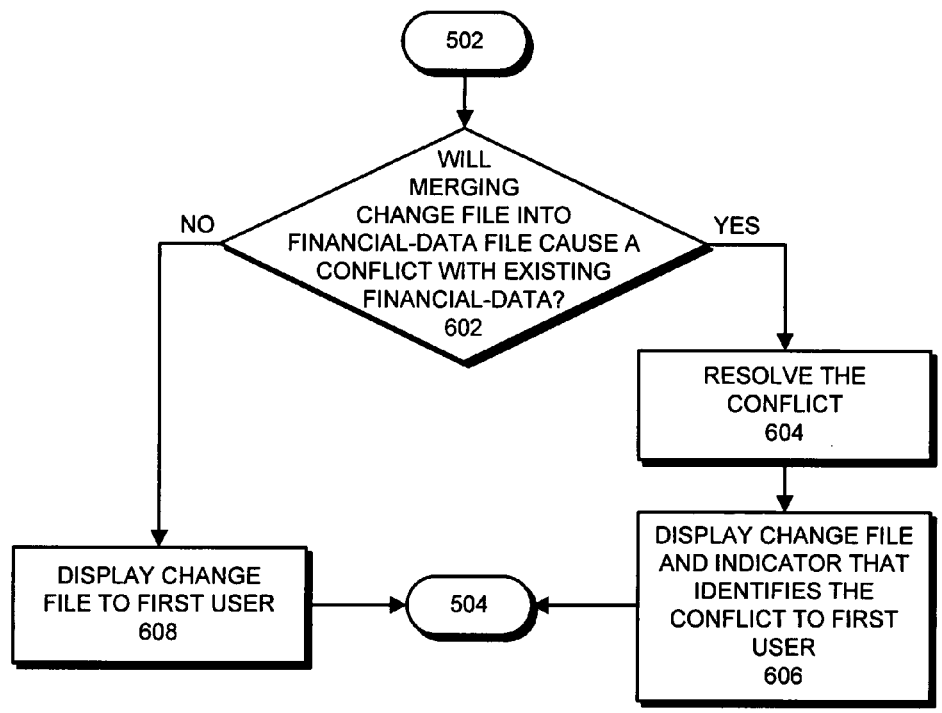
FIG. 6 presents a flow chart illustrating the process of displaying a change file to a first user in accordance with an embodiment of the present invention.

FIG. 6 presents a flow chart illustrating the process of displaying a change file to a first user, user 112, in accordance with an embodiment of the present invention. The process begins when financial-application 115 determines if merging a change file into a financial-data file will cause a conflict with existing financial-data in the financial-data file (step 602). Note that a conflict can exist if the specified amendments to the financial-data file cause inconsistencies with the remaining financial-data in the financial-data file. For example, assume that user 122 paid an invoice prior to the division-date, but forgot to indicate the payment in the financial-data file. Furthermore, assume that user 112 notices the "unpaid" invoice and therefore, pays the invoice and indicates the payment after the division-date. If financial-application 115 attempts to merge the change file with the financial-data file, financial-application 115 will identify a conflict between the change file and the financial-data file in the form of an attempt to change a paid invoice from unpaid to paid. Furthermore, financial-application 115 will identify a discrepancy in the payment date because in this example the invoice will be marked as paid on two separate dates.

If financial-application 115 determines that merging the change file with the financial-data file will cause a conflict, financial-application 115 resolves the conflict (step 604). Note that this can involve: always accepting the change file's version of the conflicting financial-data; always accepting the financial-data file's version of the conflicting data; asking user 112 to decide which financial-data to accept; or any other method for resolving a conflict between the changes that the change file specifies and the existing financial-data in the financial-data file.

After resolving any conflicts that may exist between the change file and the financial-data file, financial-application 115 displays the change file and an indicator that identifies the resolved conflicts to user 112 (step 606). In one embodiment of the present invention, the indicator can identify unresolved conflicts.

If financial-application 115 determines that merging the change file with the financial-data file will not cause a conflict, financial-application 115 displays the change file to user 112 (step 608).

EXAMPLES

FIG. 17 illustrates a display window 1710 for displaying contents of a change file to a first user, user 112, in accordance with an embodiment of the present invention. Display window 1710 displays contents of a change file prior to user 112 confirming or accepting any of the changes specified by the change file. Furthermore, display window 1710 includes display panel 1720, notes panel 1730, and import button 1740.

In one embodiment of the present invention, display panel 1720 displays a list of all the changes that the change file specifies. This list can include: an action; a transaction type; a transaction number; a date; a name; an account; a memo; an amount; and any other data or financial-data that a financial-data file can include. Note that display panel 1720 can also display data that has not been changed, but is associated with data that user 122 modified.

In one embodiment of the present invention, user 112 can click on an expand icon, such as expand icon 1722, to reveal additional financial-data that user 122 modified, or that is associated with financial-data that user 122 modified. In this embodiment, user 112 can click on a collapse icon, such as collapse icon 1724, to hide the additional financial-data.

In one embodiment of the present invention, notes panel 1730 displays a note that user 122 has included with the change file. This note can include any message that user 122 desires to relay to user 112. Note that user 112 cannot edit the note that notes panel 1730 displays.

In one embodiment of the present invention, user 112 can edit the note that notes panel 1730 displays. This embodiment enables user 112 to modify the note, or provide an additional note for a third user (not shown) who may review the change file and view display window 1720.

In one embodiment of the present invention, user 122 can associate a note with each change to the financial-data that the change file specifies.

In one embodiment of the present invention, if user 112 decides to accept all the modifications to the financial-data that the change file specifies, user 112 can click on import button 1740.

In one embodiment of the present invention, user 112 can select and accept specific changes to the financial-data that the change file specifies.

In one embodiment of the present invention, display panel 1720 can include warning icons (not shown) to indicate to user 112 that changes to the financial-data that the change file specifies conflicts with existing financial-data included in the financial-data file. These warning icons can be located next to the conflicting changes to the financial-data that the change file specifies.

In one embodiment of the present invention, display panel 1720 can display suggested solutions to the conflicting financial-data.

In one embodiment of the present invention, display panel 1720 can display solutions to the conflicting financial-data that financial-application 115 has enacted.

Figure 18:
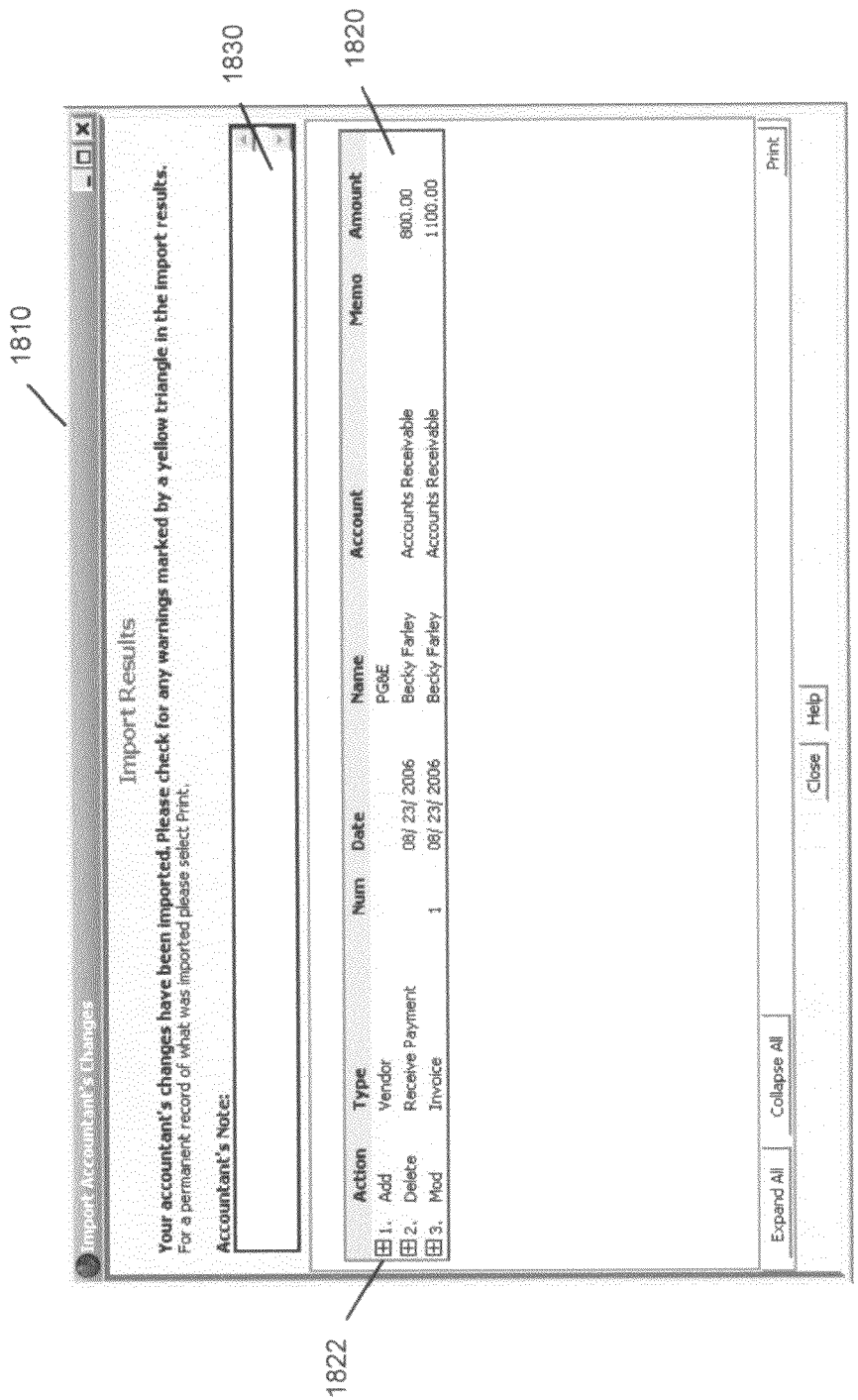
FIG. 18 illustrates a results window for displaying changes made to a financial-data file in accordance with an embodiment of the present invention.

FIG. 18 illustrates a results window 1810 for displaying changes made to a financial-data file in accordance with an embodiment of the present invention. User 112 can view results window 1810 after clicking import button 1740. Results window 1810 can include results panel 1820, and notes panel 1830.

In one embodiment of the present invention, results panel 1820 displays the modified financial-data that user 112 has accepted. In this embodiment, results panel 1820 can also display data associated with the accepted modified financial-data.

In one embodiment of the present invention, user 112 can click on expand icon 1822 to view additional financial-data that has been modified or that is associated with the modified financial-data. In this embodiment, user 112 can click on a hide icon (not shown) to hide this additional financial-data.

In one embodiment of the present invention, results panel 1820 can display warnings associated with changes from the change file that user 112 accepted. For example, if merging the change file with the financial-data file resulted in a discrepancy between an amount due for an invoice and an amount paid for the invoice, results panel 1820 can include a warning icon next to the modified financial-data that caused this discrepancy in the financial-data file.

In one embodiment of the present invention, results panel 1820 can display inconsistencies between changes that the change file specified and the financial-data included in the financial-data file before financial-application 115 merged the change file with the financial-data file. In this embodiment, results panel 1820 can display a list of the actions that financial-application 115 performed to resolve these inconsistencies.

In one embodiment of the present invention, notes panel 1830 displays a note that user 122 has included with the change file. This note can include any message that user 122 desires to relay to user 112. Note that user 112 cannot edit the note that notes panel 1830 displays.

In one embodiment of the present invention, user 112 can edit the note that notes panel 1830 displays. This embodiment enables user 112 to modify the note, or provide an additional note for a third user (not shown) who may view results panel 1820.

In one embodiment of the present invention, user 122 can associate a note with each change to the financial-data file that the change file specifies.

Figure 7:
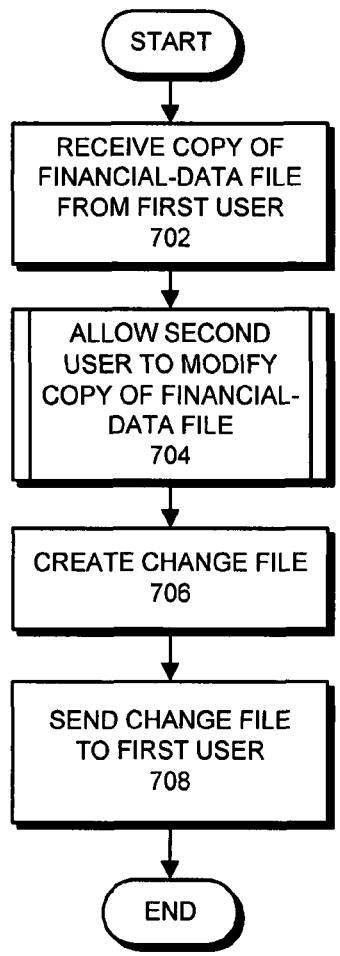
FIG. 7 presents a flow chart illustrating an additional process for facilitating simultaneous modifications to financial-data by a first user and a second user in accordance with an embodiment of the present invention.
Figure 21:
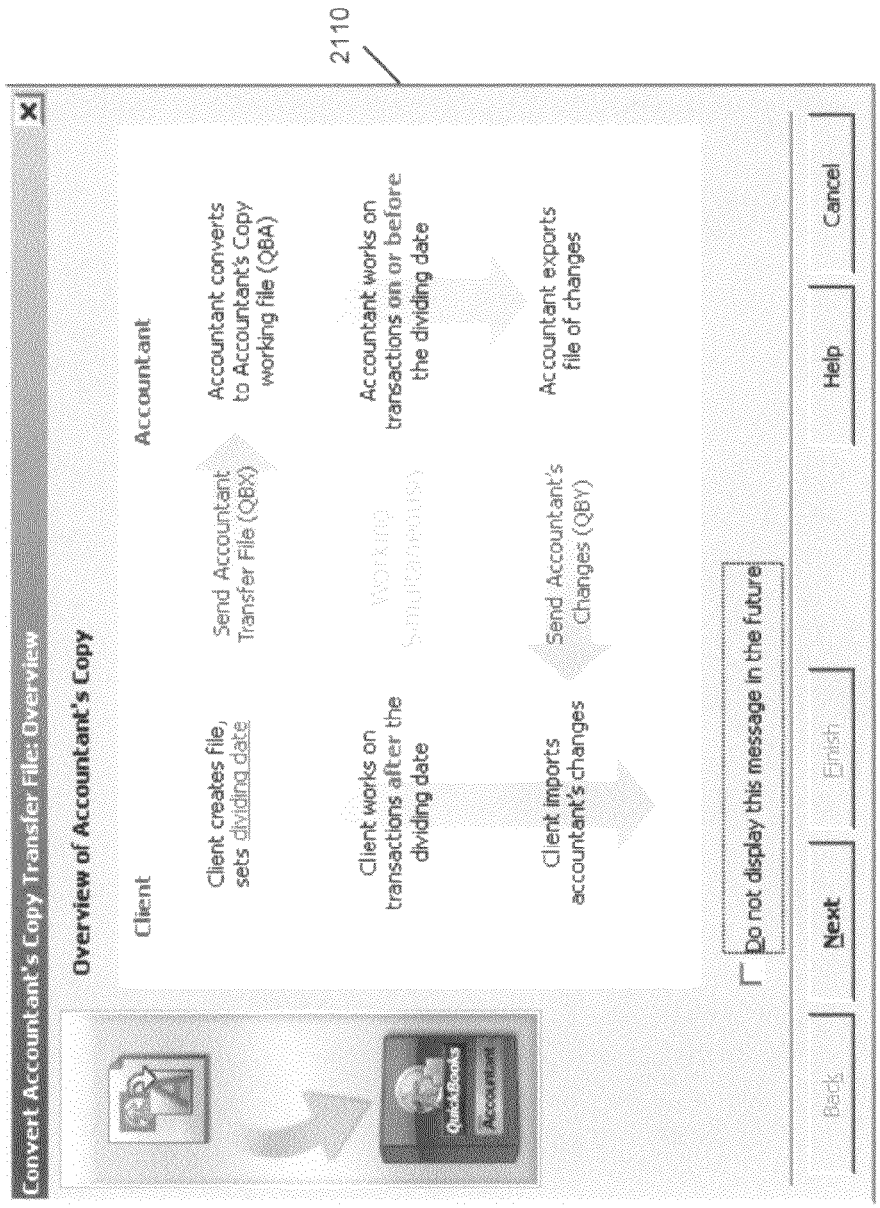
FIG. 21 illustrates an overview window for converting a financial-data transfer file into a copy of a financial-data file in accordance with an embodiment of the present invention.

Additional Process for Facilitating Simultaneous Modifications to Financial-Data FIG. 7 presents a flow chart illustrating an additional process for facilitating simultaneous modifications to financial-data by a first user 112 and a second user 122 in accordance with an embodiment of the present invention. Note that FIG. 21 presents overview-window 2110, and FIG. 22 presents overview-window 2210, both of which summarize this second process. The second process begins when financial-application 125 receives a copy of a financial-data file (step 702).

In one embodiment of the present invention, user 112 is a client, and user 122 is an accountant.

In one embodiment of the present invention, financial-application 125 receives a compressed copy of the financial-data file. In this embodiment, financial-application 125 decompresses the compressed copy of the financial-data file to obtain an uncompressed copy of the financial-data file.

In one embodiment of the present invention, financial-application 125 receives a financial-data transfer file. Note that the financial-data transfer file can be: a compressed copy of a financial-data file; an encrypted copy of a financial-data file; or any other modified copy of a financial-data file. In this embodiment, financial-application 125 can: decompress; decrypt; or perform any other process to obtain the copy of the financial-data file from the financial-data transfer file.

Figure 20:
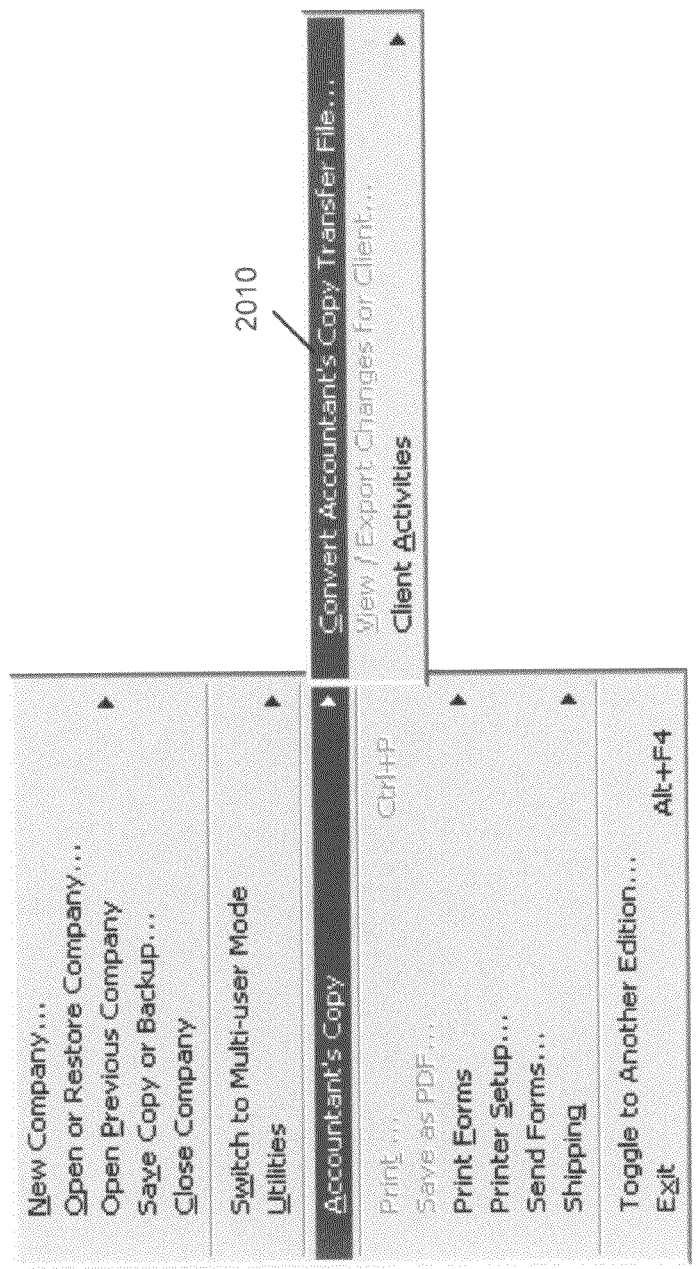
FIG. 20 illustrates a menu item for converting a financial-data transfer file into a copy of a financial-data file in accordance with an embodiment of the present invention.
Figure 23:
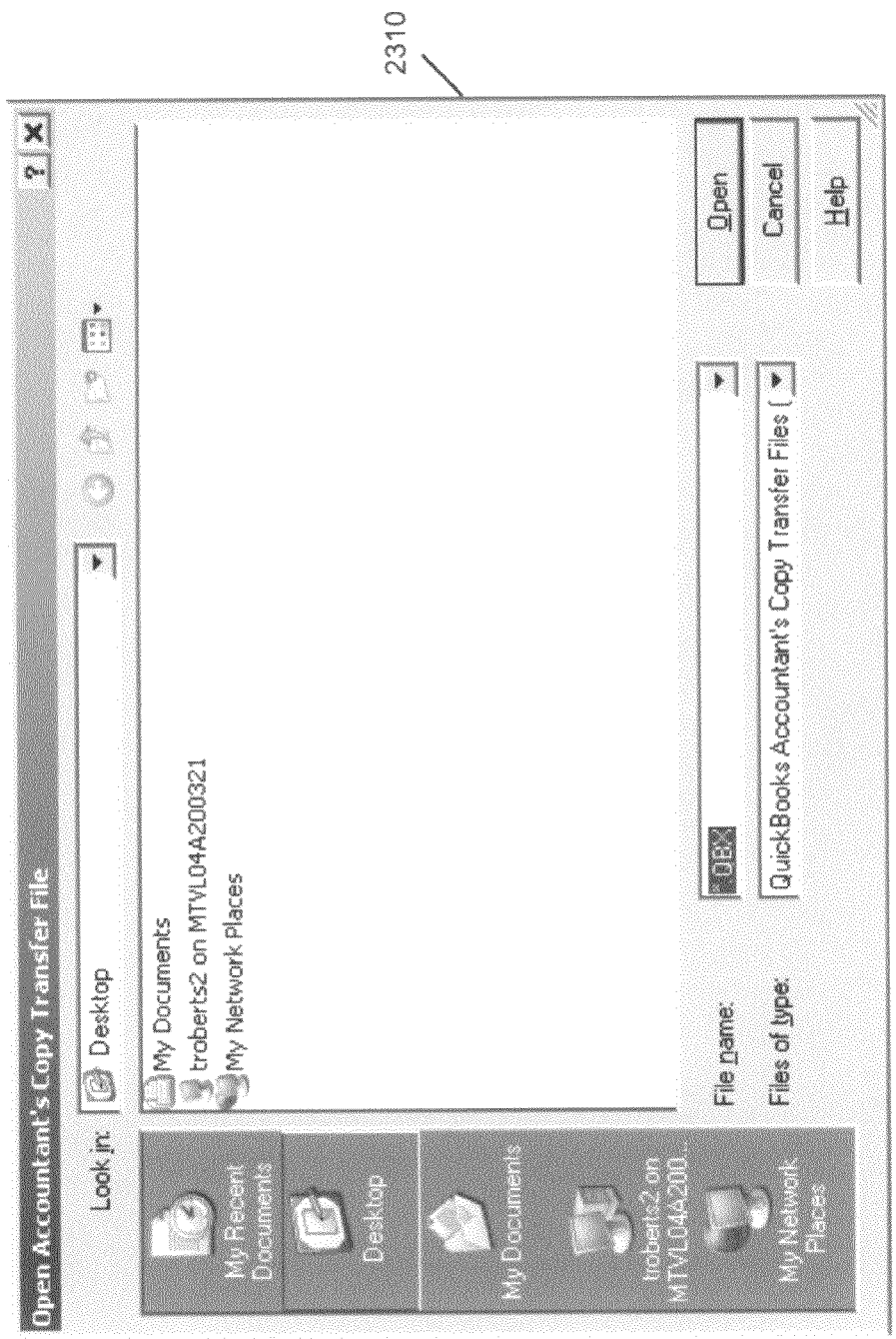
FIG. 23 illustrates a file-selection window for selecting a financial-data transfer file to convert to a copy of a financial-data file in accordance with an embodiment of the present invention.

In one embodiment of the present invention, user 122 can initiate the process of obtaining the copy of the financial-data file from the financial-data transfer file by selecting menu-item 2010, which is illustrated in FIG. 20. In this embodiment, user 122 can select a financial-data transfer file to convert into a copy of a financial-data file via file-selection window 2310, which is illustrated in FIG. 23.

Figure 24:
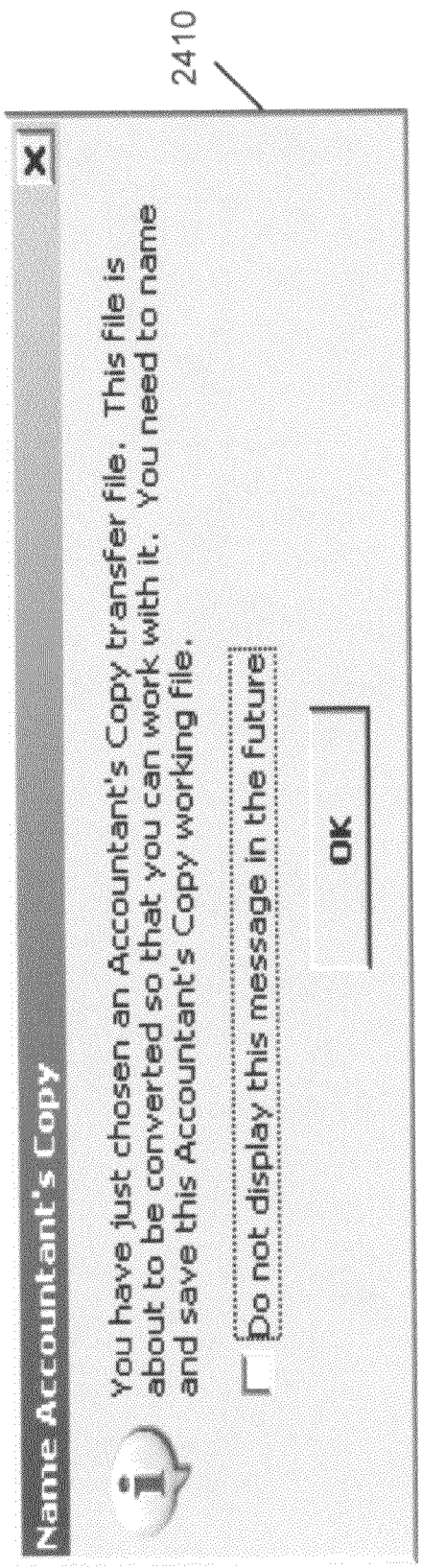
FIG. 24 illustrates an informational dialog box for informing a user that the user is required to select a name and to save a copy of a financial-data file in accordance with an embodiment of the present invention.

In one embodiment of the present invention, financial-application 125 informs user 122 that user 122 is required to select a name for the copy of the financial-data file, and to save the copy of the financial-data file by displaying information dialog box 2410, which is illustrated in FIG. 24, to user 122.

Figure 25:
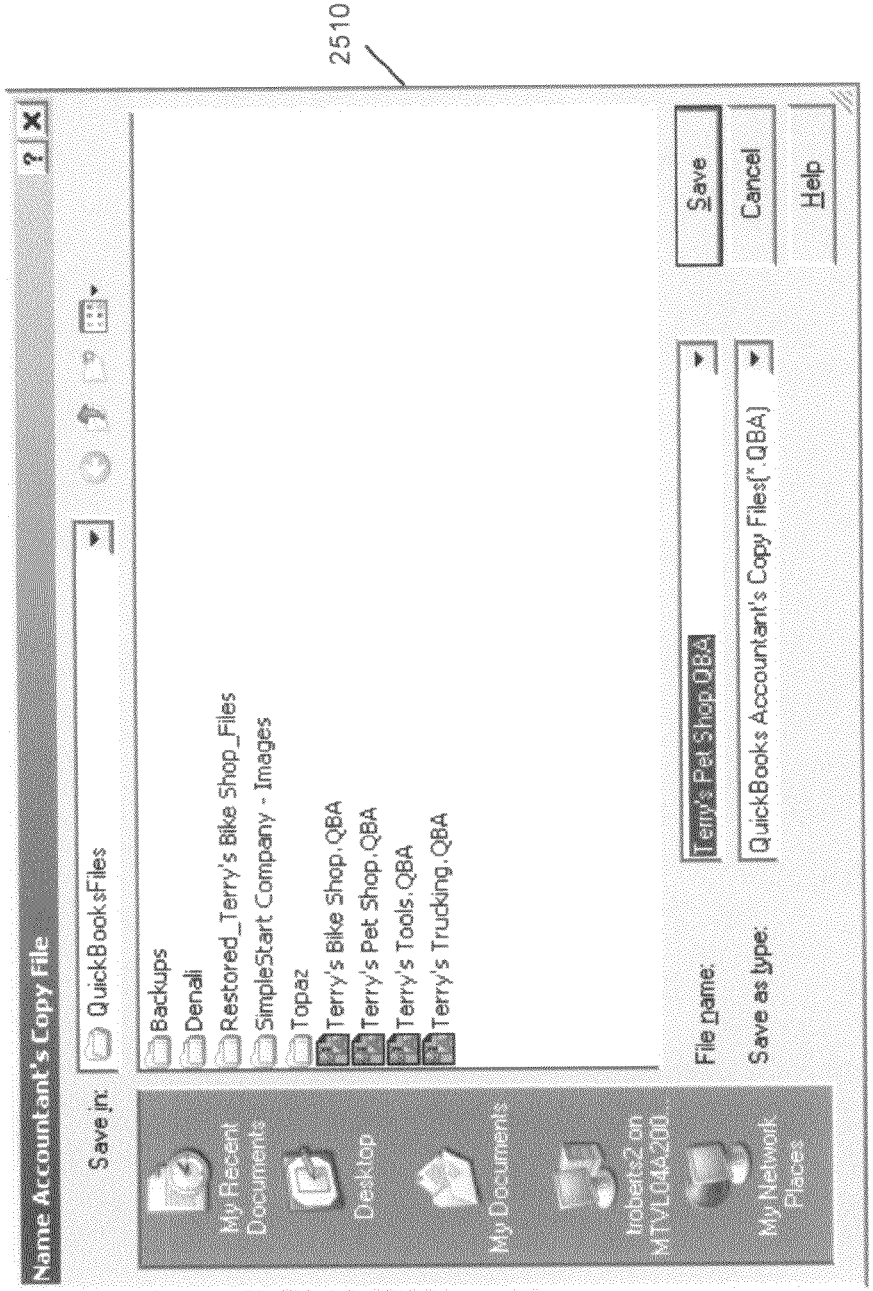
FIG. 25 illustrates a second save window for saving a copy of a financial-data file in accordance with an embodiment of the present invention.

In one embodiment of the present invention, user 122 can select a name and a location to save the copy of the financial-data file via save-window 2510, which is illustrated in FIG. 25.

Figure 26:
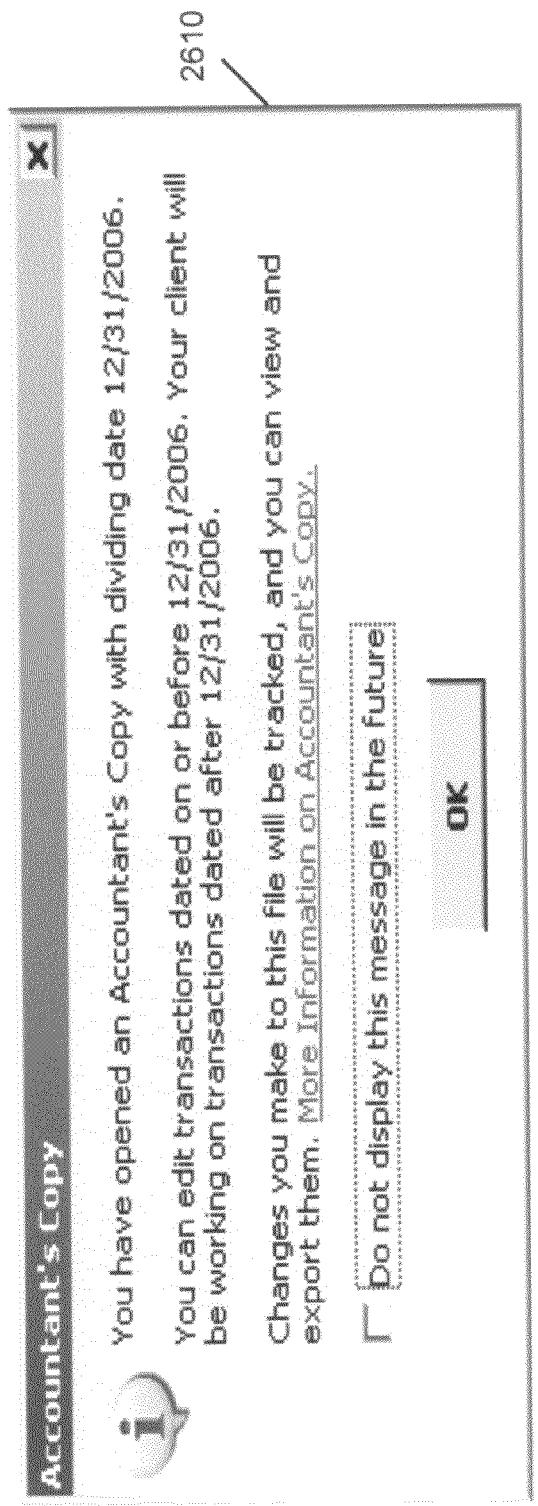
FIG. 26 illustrates a second reminder dialog box, which reminds the second user that only financial-data associated with a date prior to or equal to a division-date can be edited in accordance with an embodiment of the present invention.

In one embodiment of the present invention, after opening the copy of the financial-data file for user 122 to edit, financial-application 125 presents reminder dialog box 2610, which is illustrated in FIG. 26, to remind user 122 that user 122 can only edit financial-data associated with a date prior to or equal to the division-date in the copy of the financial-data file.

After receiving the copy of the financial-data file, financial-application 125 enables user 122 to modify the copy of the financial-data file (step 704), while financial-application 115 enables user 112 to modify the financial-data file. Note that this is a multi-step process, which is described in more detail below with reference to FIG. 8.

Next, financial-application 125 creates a change file (step 706). This change file includes modifications that user 122 made to the copy of the financial-data file. These modifications can include: an addition of financial-data; a deletion of financial-data; and an amendment of existing financial-data in the copy of the financial-data file.

In one embodiment of the present invention, the change file includes the copy of the financial-data file.

Figure 27:
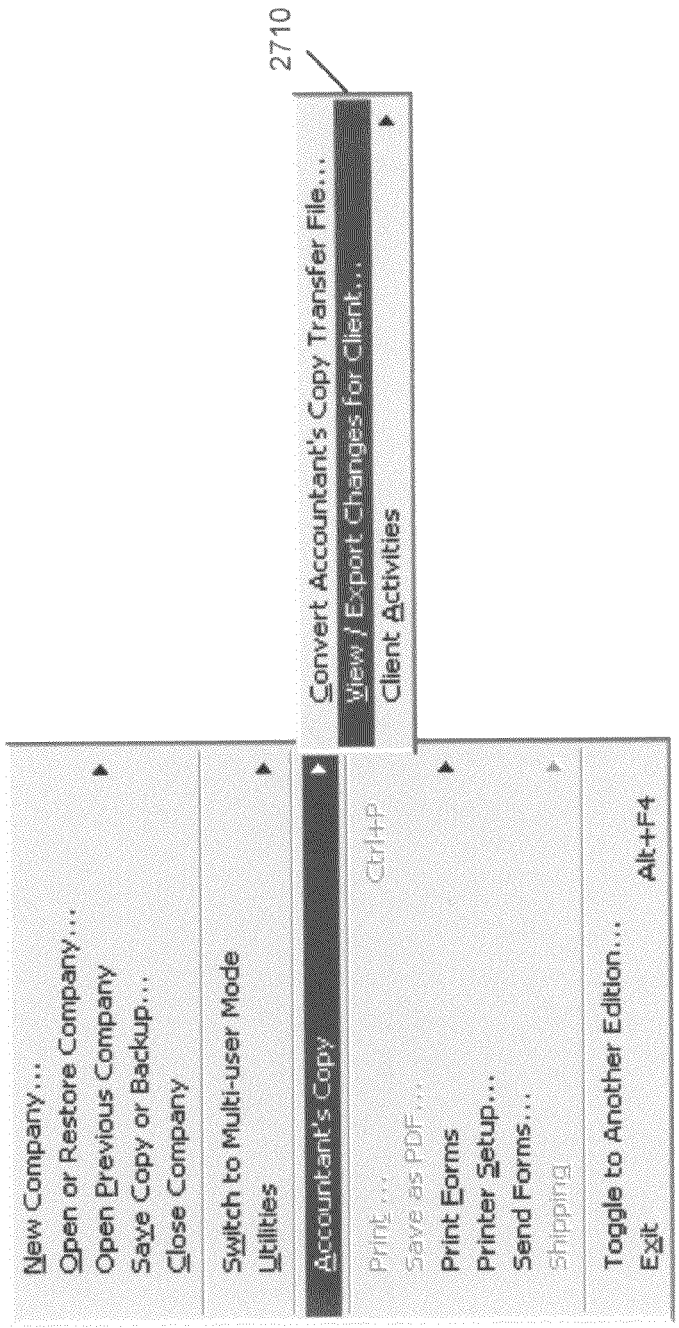
FIG. 27 illustrates a view/export menu item for viewing and exporting a change file in accordance with an embodiment of the present invention.

Next, financial-application 125 sends the change file to user 112 (step 708). In one embodiment of the present invention, user 122 can initiate this step by selecting menu-item 2710, which is illustrated in FIG. 27.

Figure 28:
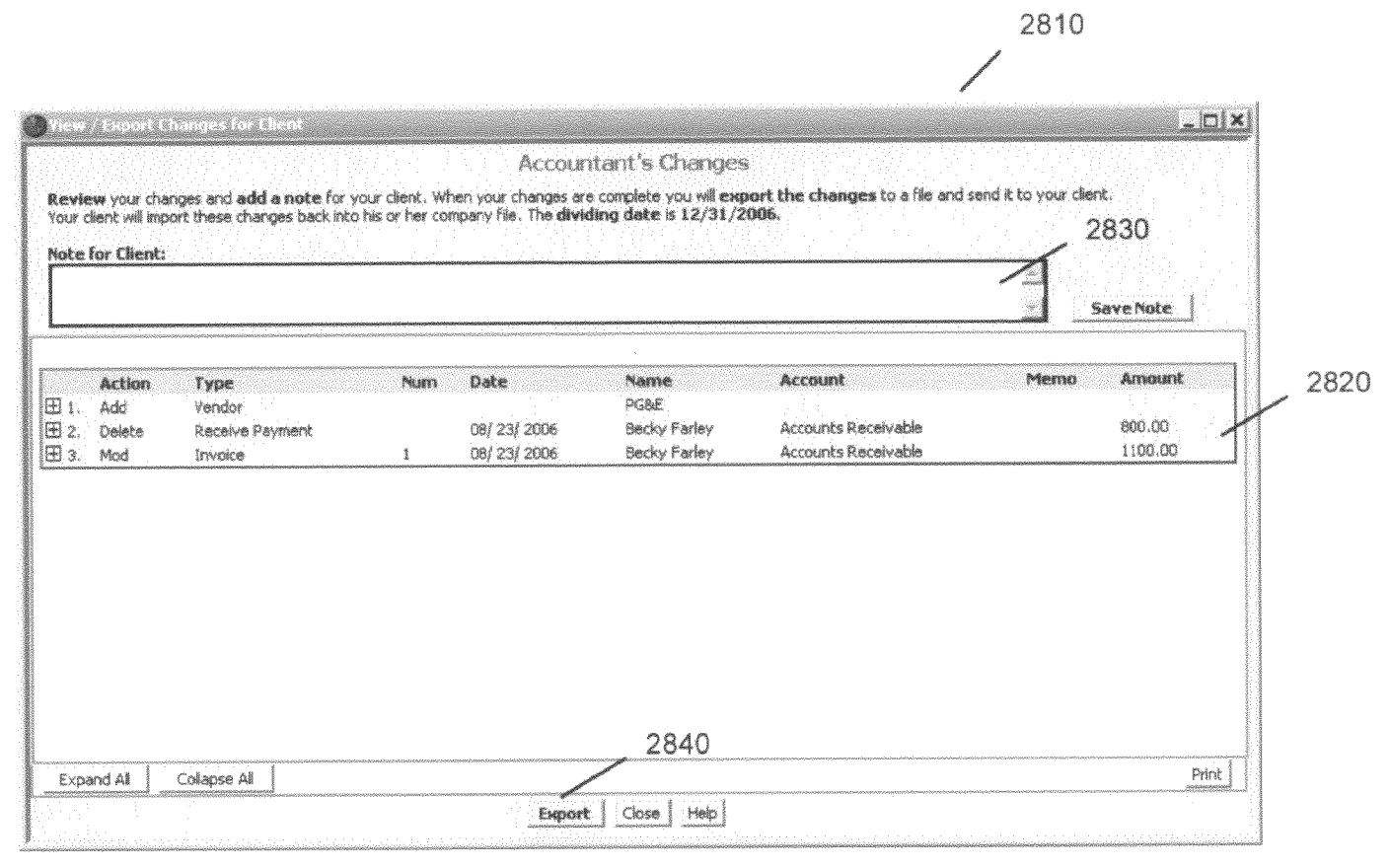

In one embodiment of the present invention, selecting menu-item 2710 will cause financial-application 125 to display change-window 2810, which is illustrated in FIG. 28. Note that change-window 2810 includes display-panel 2820, which displays modifications user 122 has made to financial-data associated with the copy of the financial-data file. Note that display-panel 2820 can also display financial-data that has not been modified, but is associated with modified financial-data.

In one embodiment of the present invention, user 122 can enter a note for user 112 in note panel 2830. Financial-application 125 sends this note with the change file when sending the change file to user 112.

In one embodiment of the present invention, if user 122 is satisfied with the changes to the financial-data that display-panel 2820 displays, user 122 can click on export-button 2840 to send the change file to user 112.

Figure 29:
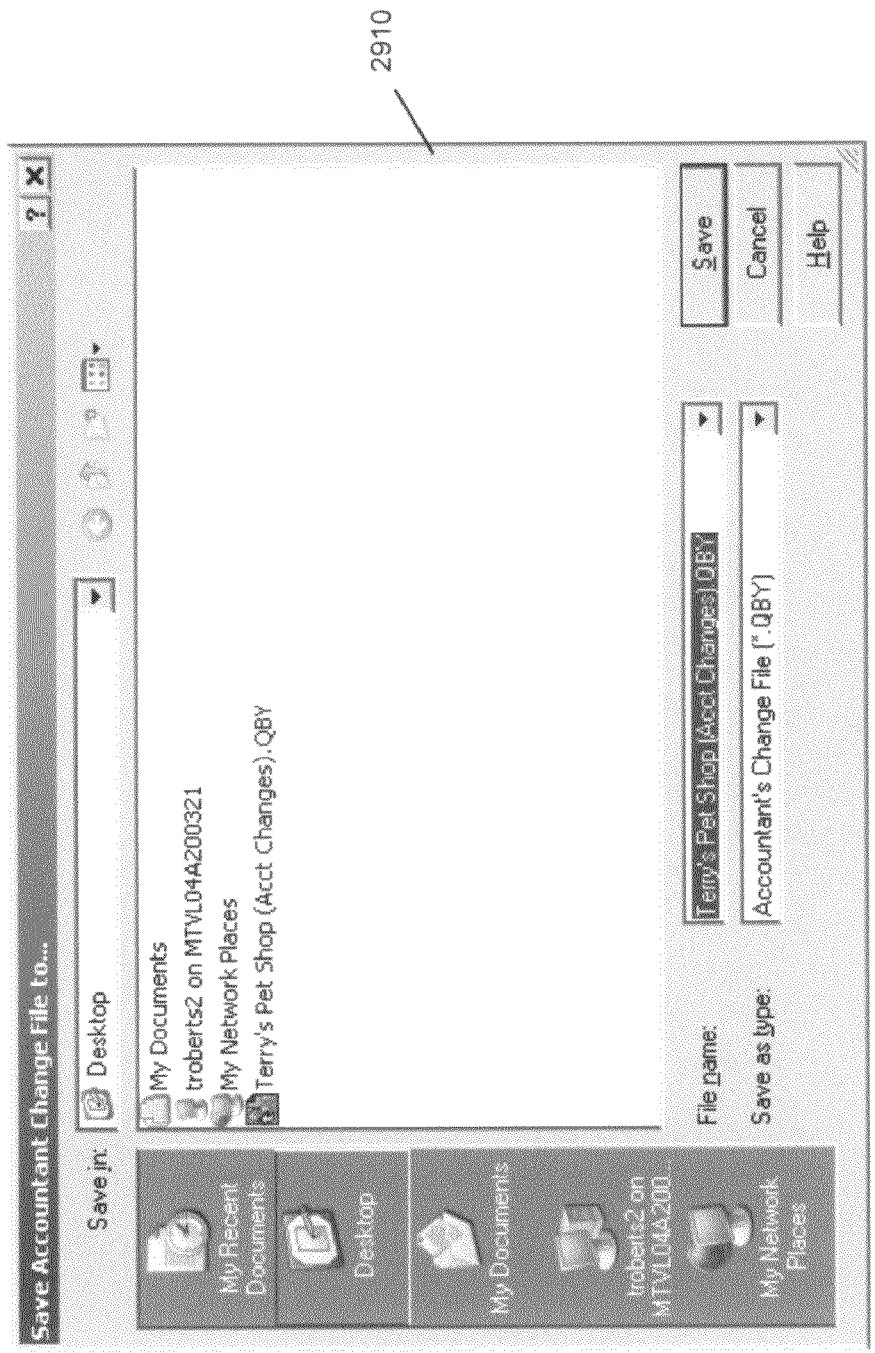
FIG. 29 illustrates a third save window for saving a change file in accordance with an embodiment of the present invention.

In one embodiment of the present invention, selecting export-button 2840 causes financial-application 125 to open save-window 2910, which is illustrated in FIG. 29. Save-window 2910 enables user 122 to select a name and location to store the change file.

Figure 30:
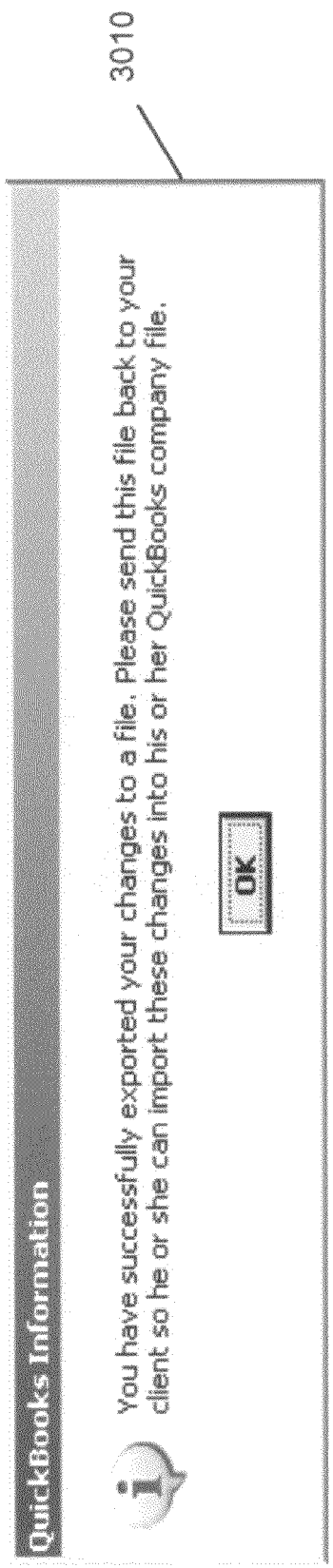
FIG. 30 illustrates a confirmation dialog box, which displays confirmation of creation of a change file in accordance with an embodiment of the present invention.

In one embodiment of the present invention, financial-application 125 displays confirmation dialog box 3010, which is illustrated in FIG. 30, to user 122. Confirmation dialog box 3010 displays confirmation of creation of the change file. User 122 can then send the change file to user 112, or instruct financial-application 125 to send the change file to user 112.

In one embodiment of the present invention, financial-application 125 sends the change file to client computing system 110 or financial-application 115.

In one embodiment of the present invention, financial-application 125 sends the change file to database 140 or server 150, and informs financial-application 115, client computing system 110, or user 112 that the change file is available for retrieval.

Allowing a Second User to Modify a Copy of a Financial-Data File

Figure 8:
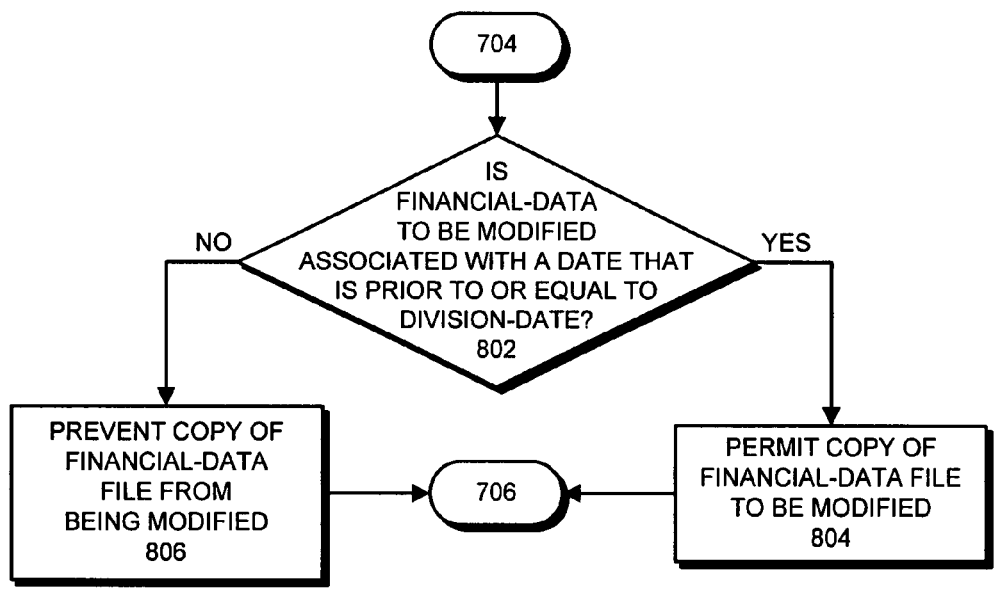
FIG. 8 presents a flow chart illustrating the process of allowing a second user to modify a copy of a financial-data file in accordance with an embodiment of the present invention.

FIG. 8 presents a flow chart illustrating the process of allowing a second user, user 122, to modify a copy of a financial-data file in accordance with an embodiment of the present invention. The process begins when financial-application 125 determines if user 122 is attempting to modify financial-data that is associated with a date that is prior to or equal to the division-date (step 802). If so, financial-application 125 permits user 122 to modify the copy of the financial-data file (step 804). If not, financial-application 125 prevents user 122 from modifying the copy of financial-data file (step 806).

In one embodiment of the present invention, user 122 can edit the copy of the financial-data file by: adding new financial-data; deleting existing financial-data; and amending existing financial-data to the copy of the financial-data file.

Dividing a Financial-Data File

One embodiment of the present invention provides a system that facilitates dividing financial data to facilitate simultaneous modifications by multiple users. During operation, the system receives division-criteria, which facilitates dividing financial-data into a first subset and a second subset. Next, the system creates a copy of the financial-data which includes the division-criteria. The system then allows a first user to modify the first subset of the financial-data. The system also sends the copy of the financial-data to a second user, thereby enabling the second user to modify the second subset of the financial-data in the copy of the financial-data to create a change file. Subsequently, the system receives the change file from the second user, wherein the change file comprises modifications to the financial-data. Finally, the system merges the change file into the financial-data.

In some embodiments of the present invention, the system creates an additional copy of the financial-data file which includes the division-criteria, wherein the division-criteria facilitates dividing the financial-data into three or more subsets. During operation, the system sends the additional copy of the financial-data to a third user, thereby enabling the third user to modify a third subset of the financial-data in the additional copy of the financial-data to create an additional change file. The system also receives the additional change file from the third user. Finally, the system merges the additional change file into the financial-data.

In some embodiments of the present invention, the first user has read-only access to the second subset of the financial-data, and the second user has read-only access to the first subset of the financial-data.

In some embodiments of the present invention, the system receives a cancel command to cancel the simultaneous modifications to the financial data. In response to the cancel command, the system grants the first user read-write access to the second subset of the financial-data. The system also discards the change file from the second user.

In some embodiments of the present invention, the first user is allowed to create data items in the second subset of the financial-data, and the second user is allowed to create data items in the first subset of the financial-data. In other embodiments of the present invention, the first user is allowed to create data items in the first subset of the financial data and in the second subset of the financial-data, while the second user is allowed to create data items only in the second subset of the financial-data. In other embodiments of the present invention, the second user is allowed to create data items in the first subset of the financial data and in the second subset of the financial-data, while the first user is allowed to create data items only in the first subset of the financial-data.

In some embodiments of the present invention, the first user has read-write access to data items in the second subset of the financial-data, and the second user has read-write access to the data items in the first subset of the financial-data.

In some embodiments of the present invention, the division-criteria can include: a division date, a date-range, an account type, an object type, and a transaction type.

In some embodiments of the present invention, receiving the division-criteria can involve receiving the division-criteria from: the first user, the second user, or a third-party.

In some embodiments of the present invention, the copy of the financial-data comprises only the second subset of the financial-data.

Figure 31:
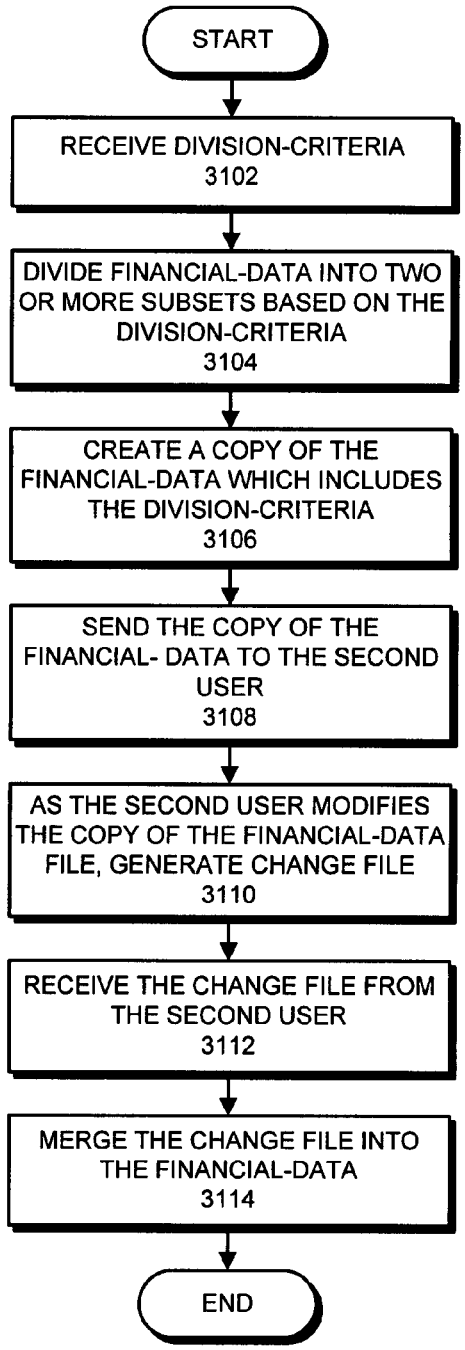
FIG. 31 presents a flow chart illustrating the process of dividing a financial-data file in accordance with an embodiment of the present invention.

FIG. 31 presents a flow chart illustrating the process of dividing a financial-data file in accordance with an embodiment of the present invention. During operation, the system receives division-criteria (operation 3102), wherein the division-criteria is received from user 112, user 122, or a third-party. Note that the division-criteria may include: a division date, a date-range, an account type, an object type, and a transaction type. For example, in one embodiment, the division-criteria is specified as the previous fiscal quarter, while in another embodiment, the division-criteria is specified as all "business" accounts. When receiving the division-criteria, the system divides the financial-data into two or more subsets of the financial data based on the division-criteria (operation 3104).

Next, the system creates a copy of the financial-data, which includes the division-criteria (operation 3106). Note that this copy may include the entire set of the financial-data, or it may include only a subset of the financial-data. The system then sends the copy of the financial-data to a second user, such as user 122 (operation 3108). Next, user 112 and user 122 make simultaneous modifications to the financial-data. As user 122 modifies the financial-data in the copy of the financial-data, the system generates a change file (operation 3110). Finally, the system receives the change file from user 122 (operation 3112), and merges the change file back into the financial-data (operation 3114).

Note that in some embodiments of the present invention, users have access to only the data in the subset to which they have been assigned, while in other embodiments of the present invention, users have read-write access to the subset to which they have been assigned and read-only access to the other subsets. In other embodiments of the present invention, user 112 has read-write access to all of the subsets, while user 122 has read-only access to the first subset and read-write access to the second subset. In some embodiments of the present invention, these permissions are configured by user 112.

Canceling Simultaneous Edits to a Financial-Data File

Figure 32:
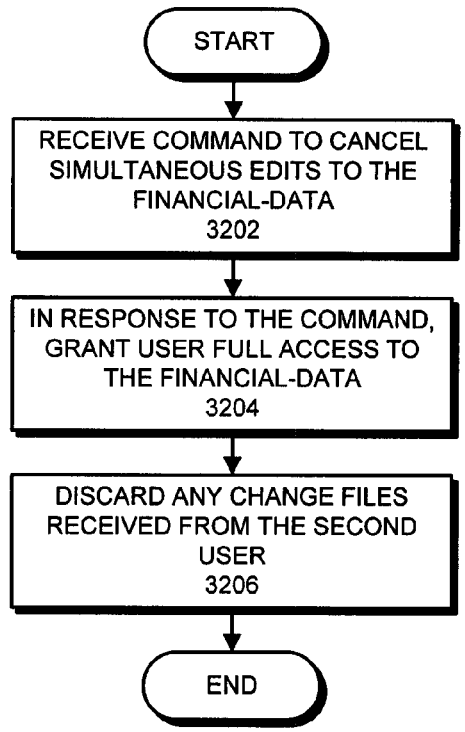
FIG. 32 presents a flow chart illustrating the process of canceling simultaneous edits to a financial-data file in accordance with an embodiment of the present invention.

FIG. 32 presents a flow chart illustrating the process of canceling simultaneous edits to a financial-data file in accordance with an embodiment of the present invention. During operation, the system receives a command to cancel simultaneous edits to the financial-data (operation 3202). This may be necessary for a number of reasons. For example, if user 122 never received the copy of the financial-data, or user 112 no longer desires to work collaboratively with user 122.

In response to the command, the system grants user 112 full access to the financial-data (operation 3204), thus returning the financial data to a permission state that existed prior to receiving the division-criteria. Finally, the system simply discards any change file that may be received from user 122 (operation 3206).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating simultaneous modifications to financial-data, the method comprising:
   receiving a first file comprising financial data at a computing system comprising a processor;
   receiving division-criteria at the computing system, wherein the division-criteria facilitates dividing financial-data into a first subset and a second subset, and wherein the financial-data comprises transaction data with one or more fields and corresponding values;
creating a second file comprising a copy of the financial-data which includes the division-criteria, wherein both the first file and the second file comprise the first subset and the second subset;
allowing a first user to modify the first subset in the first file;
creating a first lock to prevent the first user from modifying the second subset in the first file;
creating a second lock to prevent a second user from modifying the first subset in the second file;
sending the second file to the second user, thereby enabling the second user to modify the second subset in the second file to create a change file;
receiving the change file from the second user, wherein the change file comprises modifications to the second subset;
merging the change file into the financial-data in the first file; and
releasing the first lock.

2. The method of claim 1, further comprising:
creating an additional copy of the financial-data file which includes the division-criteria, wherein the division-criteria facilitates dividing the financial-data into three or more subsets;
sending the additional copy of the financial-data to a third user, thereby enabling the third user to modify a third subset of the financial-data in the additional copy of the financial-data to create an additional change file;
receiving the additional change file from the third user; and
merging the additional change file into the financial-data.

3. The method of claim 1, wherein the first user has read-only access to the second subset of the financial-data, and wherein the second user has read-only access to the first subset of the financial-data.

4. The method of claim 3, further comprising:
receiving a cancel command to cancel the simultaneous modifications to the financial data;
in response to the cancel command, granting the first user read-write access to the second subset of the financial-data; and
discarding the change file from the second user.

5. The method of claim 3, wherein the first user is allowed to create data items in the second subset of the financial-data, and wherein the second user is allowed to create data items in the first subset of the financial-data.

6. The method of claim 5, wherein the first user has read-write access to data items in the second subset of the financial-data, and wherein the second user has read-write access to the data items in the first subset of the financial-data.

7. The method of claim 1, wherein the division-criteria can include:
a division date;
a date-range;
an account type;
an object type; and
a transaction type.

8. The method of claim 1, wherein receiving the division-criteria can involve receiving the division-criteria from:
the first user;
the second user; or
a third-party.

9. The method of claim 1, wherein the copy of the financial-data comprises only the second subset of the financial-data.

10. A computer-readable storage medium storing instructions that when executed by a computer cause the computer to perform a method for facilitating simultaneous modifications to financial-data, the method comprising:
receiving a first file comprising financial data at a computing system;
receiving division-criteria at the computing system, wherein the division-criteria facilitates dividing financial-data into a first subset and a second subset, and wherein the financial-data comprises transaction data with one or more fields and corresponding values;
creating a second file comprising a copy of the financial-data which includes the division-criteria, wherein both the first file and the second file comprise the first subset and the second subset;
allowing a first user to modify the first subset in the first file;
creating a first lock to prevent the first user from modifying the second subset in the first file;
creating a second lock to prevent a second user from modifying the first subset in the second file;
sending the second file to the second user, thereby enabling the second user to modify the second subset in the second file to create a change file;
receiving the change file from the second user, wherein the change file comprises modifications to the second subset;
merging the change file into the financial-data in the first file; and
releasing the first lock.

11. The computer-readable storage medium of claim 10, wherein the method further comprises:
creating an additional copy of the financial-data file which includes the division-criteria, wherein the division-criteria facilitates dividing the financial-data into three or more subsets;
sending the additional copy of the financial-data to a third user, thereby enabling the third user to modify a third subset of the financial-data in the additional copy of the financial-data to create an additional change file;
receiving the additional change file from the third user; and
merging the additional change file into the financial-data.

12. The computer-readable storage medium of claim 10, wherein the first user has read-only access to the second subset of the financial-data, and wherein the second user has read-only access to the first subset of the financial-data.

13. The computer-readable storage medium of claim 12, wherein the method further comprises:
receiving a cancel command to cancel the simultaneous modifications to the financial data;
in response to the cancel command, granting the first user read-write access to the second subset of the financial-data; and
discarding the change file from the second user.

14. The computer-readable storage medium of claim 12, wherein the first user is allowed to create data items in the second subset of the financial-data, and wherein the second user is allowed to create data items in the first subset of the financial-data.

15. The computer-readable storage medium of claim 14, wherein the first user has read-write access to data items in the second subset of the financial-data, and wherein the second user has read-write access to the data items in the first subset of the financial-data.

16. The computer-readable storage medium of claim 10, wherein the division-criteria can include:
a division date;
a date-range;
an account type;
an object type; and
a transaction type.

17. The computer-readable storage medium of claim 10, wherein receiving the division-criteria can involve receiving the division-criteria from:
- the first user;
- the second user; or
- a third-party.

18. The computer-readable storage medium of claim 10, wherein the copy of the financial-data comprises only the second subset of the financial-data.

19. An apparatus for facilitating simultaneous modifications to financial-data, comprising:
- a processor;
- a receiving mechanism configured to receive a first file comprising financial data;
- wherein the receiving mechanism is further configured to receive division-criteria, which facilitates dividing financial-data into a first subset and a second subset, and wherein the financial-data comprises transaction data with one or more fields and corresponding values;
- a creation mechanism configured to create a second file comprising a copy of the financial-data which includes the division-criteria, wherein both the first file and the second file comprise the first subset and the second subset;
- a modification mechanism configured to allow a first user to modify the first subset in the first file;
- wherein the creation mechanism is further configured to create a first lock to prevent the first user from modifying the second subset in the first file;
- wherein the creation mechanism is further configured to create a second lock to prevent a second user from modifying the first subset in the second file;
- a delivery mechanism configured to send the second file to the second user, thereby enabling the second user to modify the second subset in the second file to create a change file;
- wherein the receiving mechanism is further configured to receive the change file from the second user, wherein the change file comprises modifications to the second subset;
- a merge mechanism configured to merge the change file into the financial-data in the first file; and
- a lock-releasing mechanism configured to release the first lock.

20. The apparatus of claim 19:
- wherein the creation mechanism is further configured to create an additional copy of the financial-data file which includes the division-criteria, wherein the division-criteria facilitates dividing the financial-data into three or more subsets;
- wherein the delivery mechanism is further configured to send the additional copy of the financial-data to a third user, thereby enabling the third user to modify a third subset of the financial-data in the additional copy of the financial-data to create an additional change file;
- wherein the receiving mechanism is further configured to receive the additional change file from the third user; and
- wherein the merge mechanism is further configured to merge the additional change file into the financial-data.

21. A computer-implemented method for facilitating simultaneous modifications to financial-data, the method comprising:
- receiving a copy of financial-data from a first user at a computing system comprising a processor, wherein the copy of the financial data includes a division-criteria, which facilitates dividing financial-data into a first subset and a second subset, wherein the copy of financial-data includes both the first subset and the second subset, and wherein the financial-data comprises transaction data with one or more fields and corresponding values;
- wherein the second subset in a file containing the financial-data that is stored on a second computer system is locked using a first lock to prevent a first user of the second computer system from modifying the second subset in the file, wherein the first user is allowed modify the first subset in the file;
- wherein the first subset in the copy of the financial-data is locked using a second lock to prevent a second user from modifying the first subset;
- allowing the second user to modify the second subset of the financial-data;
- creating a change file, which includes modifications to the second subset of the financial-data by the second user; and
- sending the change file to the first user, thereby enabling the first user to merge the change file into the financial-data.

22. A computer-readable storage medium storing instructions that when executed by a computer cause the computer to perform a method for facilitating simultaneous modifications to financial-data, the method comprising:
- receiving a copy of financial-data from a first user, wherein the copy of the financial data includes a division-criteria, which facilitates dividing financial-data into a first subset and a second subset, wherein the copy of financial-data includes both the first subset and the second subset, and wherein the financial-data comprises transaction data with one or more fields and corresponding values;
- wherein the second subset in a file containing the financial-data that is stored on a second computer system is locked using a first lock to prevent a first user of the second computer system from modifying the second subset in the file, wherein the first user is allowed modify the first subset in the file;
- wherein the first subset in the copy of the financial-data is locked using a second lock to prevent a second user from modifying the first subset;
- allowing the second user to modify the second subset of the financial-data;
- creating a change file, which includes modifications to the second subset of the financial-data by the second user; and
- sending the change file to the first user, thereby enabling the first user to merge the change file into the financial-data.

23. An apparatus for facilitating simultaneous modifications to financial-data, comprising:
- a processor;
- a receiving mechanism configured to receive a copy of financial-data from a first user, wherein the copy of the financial data includes a division-criteria, which facilitates dividing financial-data into a first subset and a second subset, wherein the copy of financial-data includes both the first subset and the second subset, and wherein the financial-data comprises transaction data with one or more fields and corresponding values;
- wherein the second subset in a file containing the financial-data that is stored on a second computer system is locked using a first lock to prevent a first user of the second computer system from modifying the second subset in the file, wherein the first user is allowed modify the first subset in the file;
- a modification mechanism configured to allow a second user to modify the second subset of the financial-data, wherein the modification mechanism prevents the second user from modifying the first subset because the first subset in the copy of the financial-data is locked using a second lock to prevent the second user from modifying the first subset;

a creation mechanism configured to create a change file, which includes modifications to the second subset of the financial-data by the second user; and a delivery mechanism configured to send the change file to the first user, thereby enabling the first user to merge the change file into the financial-data.

\* \* \* \* \*